(12) United States Patent
Batur et al.

(10) Patent No.: US 10,025,317 B2
(45) Date of Patent: Jul. 17, 2018

(54) METHODS AND SYSTEMS FOR CAMERA-BASED AUTONOMOUS PARKING

(71) Applicant: Faraday&Future Inc., Gardena, CA (US)

(72) Inventors: Aziz Umit Batur, Torrance, CA (US); Oliver Max Jeromin, Holland, MI (US); Sowmya Gade, Torrance, CA (US); Paul Alan Theodosis, Rancho Palos Verdes, CA (US); Michael Venegas, Placentia, CA (US)

(73) Assignee: FARADAY&FUTURE INC., Gardena, CA (US)

( * ) Notice: Subject to any disclaimer, the term of this patent is extended or adjusted under 35 U.S.C. 154(b) by 0 days.

(21) Appl. No.: 15/620,665

(22) Filed: Jun. 12, 2017

(65) Prior Publication Data

US 2018/0095474 A1 Apr. 5, 2018

Related U.S. Application Data

(60) Provisional application No. 62/402,962, filed on Sep. 30, 2016.

(51) Int. Cl.
*G01C 22/00* (2006.01)
*G05D 1/02* (2006.01)
*B60W 30/06* (2006.01)
*G06K 9/00* (2006.01)
*G06K 9/62* (2006.01)
*G01S 19/13* (2010.01)

(52) U.S. Cl.
CPC ........... *G05D 1/0246* (2013.01); *B60W 30/06* (2013.01); *G05D 1/0274* (2013.01); *G05D 1/0278* (2013.01); *G06K 9/00812* (2013.01); *G06K 9/6212* (2013.01); *G01S 19/13* (2013.01)

(58) Field of Classification Search
CPC .. G05D 1/0246; G05D 1/0278; G05D 1/0274; B60W 30/06; G06K 9/00812; G06K 9/6212; G01S 19/13
See application file for complete search history.

(56) References Cited

U.S. PATENT DOCUMENTS 9,557,741 B1 * 1/2017 Elie ..................... G05D 1/0251
9,896,091 B1 * 2/2018 Kurt ..................... B60W 30/06
2004/0267420 A1 * 12/2004 Tanaka ................. B62D 15/027
701/36

(Continued)

*Primary Examiner* — Hussein Elchanti
(74) *Attorney, Agent, or Firm* — Morrison & Foerster LLP

(57) ABSTRACT

Camera-based autonomous parking is disclosed. An autonomous parking procedure can include detecting parking lines in images captured by a camera on a vehicle. The vehicle can be localized with respect to the parking lines based on location data for the vehicle from a GPS receiver and a location determination for the vehicle based on detected ends of the parking lines. The vehicle can further determine an occupancy state of one or more parking spaces formed by the two or more parking lines using a range sensor on the vehicle and select an empty space. A region of interest including the selected space can be identified and one or more parking lines of the selected space can be detected in an image of the region of interest. The vehicle can autonomously move to reduce errors between the location of the vehicle and the final parking position within the selected space.

20 Claims, 24 Drawing Sheets

(56) References Cited

U.S. PATENT DOCUMENTS

| | | | | |
|---|---|---|---|---|
| 2007/0282504 | A1* | 12/2007 | Luke | B62D 15/028 |
| | | | | 701/44 |
| 2009/0259365 | A1* | 10/2009 | Rohlfs | B62D 15/028 |
| | | | | 701/41 |
| 2010/0070138 | A1* | 3/2010 | Schoening | B60Q 9/004 |
| | | | | 701/42 |
| 2010/0231416 | A1* | 9/2010 | Wu | G08G 1/168 |
| | | | | 340/932.2 |
| 2013/0010119 | A1* | 1/2013 | Mitsugi | B60R 1/00 |
| | | | | 348/148 |
| 2013/0021171 | A1* | 1/2013 | Hsu | B62D 15/0285 |
| | | | | 340/932.2 |
| 2015/0057887 | A1* | 2/2015 | Kim | B62D 7/159 |
| | | | | 701/41 |
| 2017/0297385 | A1* | 10/2017 | Kim | B60C 23/02 |
| 2017/0300062 | A1* | 10/2017 | Kim | G05D 1/0255 |
| 2018/0029591 | A1* | 2/2018 | Lavoie | B60W 30/06 |

* cited by examiner $p(v_1, h_1) = p(x_1, y_1)$

METHODS AND SYSTEMS FOR CAMERA-BASED AUTONOMOUS PARKING

CROSS REFERENCE TO RELATED APPLICATION

This application claims the benefit of U.S. Provisional Patent Application No. 62/402,962, filed Sep. 30, 2016, the entire disclosure of which is incorporated herein by reference in its entirety for all intended purposes.

FIELD OF THE DISCLOSURE

This relates generally to methods and systems for an autonomous parking procedure, and more particularly to a camera- and/or location-based autonomous parking procedure.

BACKGROUND OF THE DISCLOSURE

Vehicles, especially automobiles, increasingly include various sensors for detecting and gathering information about the vehicles' surroundings. These sensors may include camera(s), range sensor(s) and/or location (including GPS) receiver(s) for use in various vehicle operations. In some examples, these sensors can be used to operate the vehicle in a fully or partially autonomous driving mode. For example, the range sensor(s) can be used to detect objects in physical proximity to the vehicle. In some examples, the vehicle can autonomously park in a parking space, including when both spaces adjacent to the vehicle are occupied, by using the range sensor(s) to detect the parking space between the parked vehicles. However, without the adjacent spaces being occupied, the range sensor(s) may be unable to locate a parking space to autonomously park in. There exists a need in the field of fully and partially autonomous vehicles for a system and method for autonomous parking that can locate a vacant parking space with high precision.

SUMMARY OF THE DISCLOSURE

Examples of the disclosure are directed to using one or more cameras on a vehicle, one or more range sensors on the vehicle and/or one or more location (including GPS) receivers on the vehicle to perform autonomous parking operations. In some examples, the vehicle can detect parking lines in a parking lot using its one or more cameras. In some examples, the vehicle can detect the end points of the parking lines. In some examples, the vehicle can localize the car in the parking lot using the detected end points and location data (such as GPS location data). In some examples, the vehicle can determine the occupancy state(s) of candidate parking spaces in the parking lot using the one or more range sensors. In some examples, if the vehicle determines that a candidate parking space is empty, the vehicle can select the candidate parking space to autonomously park in. In some examples, the vehicle can calculate a region of interest corresponding to the selected parking space. In some examples, the vehicle can detect selected parking space lines within the field of view of a selected camera. In some examples, the vehicle can calculate one or more errors in its position relative to a final parking position within the selected parking space. The vehicle can autonomously move itself to reduce and/or minimize the errors to park in the selected parking space.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Figure 1:
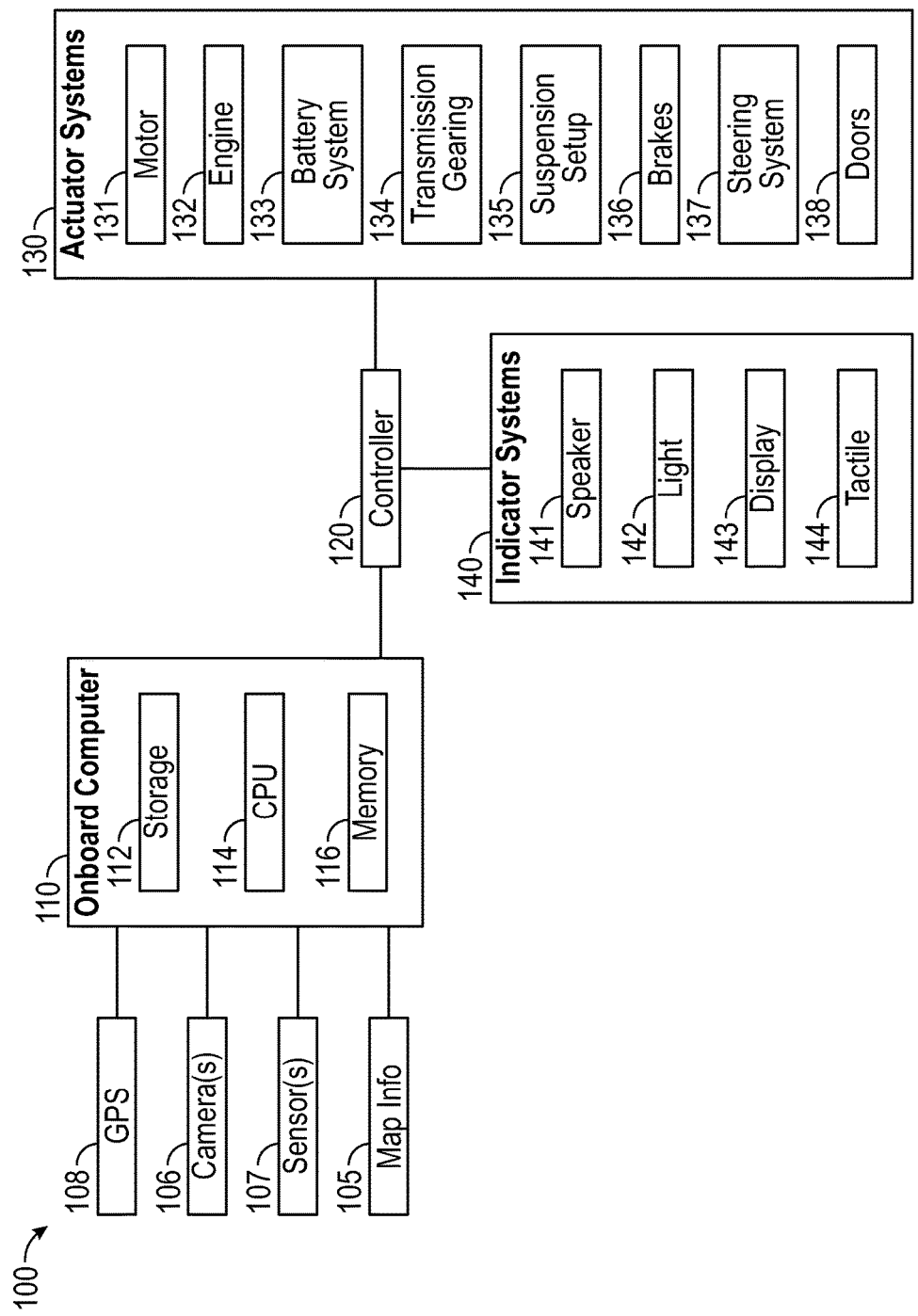
FIG. 1 illustrates an exemplary system block diagram of a vehicle control system according to examples of the disclosure.

FIG. 1 illustrates an exemplary system block diagram of vehicle control system 100 according to examples of the disclosure. Vehicle control system 100 can perform any of the methods described below with reference to FIGS. 2-9. System 100 can be incorporated into a vehicle, such as a consumer automobile. Other example vehicles that may incorporate the system 100 include, without limitation, airplanes, boats, or industrial automobiles. Vehicle control system 100 can include one or more cameras 106 capable of capturing image data (e.g., video data) of the vehicle's surroundings, as will be described with reference to FIGS. 2-9. Vehicle control system 100 can also include one or more other sensors 107 (e.g., radar, ultrasonic, LIDAR, other range sensors, etc.) capable of detecting various characteristics of the vehicle's surroundings, and a location system, such as a Global Positioning System (GPS) receiver 108, capable of determining the location of the vehicle. It should be noted that other types of location system can also be used, including cellar, WiFi, or other types of wireless-based and/or satellite-based location systems. Vehicle control system 100 can include an on-board computer 110 that is operatively coupled to the cameras 106, sensors 107 and GPS receiver 108, and that is capable of receiving the image data from the cameras and/or outputs from the sensors 107 and the GPS receiver 108. The on-board computer 110 can also be capable of receiving parking lot map information 105 (e.g., via a wireless and/or internet connection at the vehicle). It is understood by ones of ordinary skill in the art that map data can be matched to location data in map-matching functions. In accordance with one embodiment of the invention, the on-board computer 110 can be capable of performing autonomous parking in a parking lot using camera(s) 106 and GPS receiver 108, as described in this disclosure. In accordance with the preferred embodiment, the on-board computer 110 includes storage 112, memory 116, and a processor 114. Processor 114 can perform any of the methods described with reference to FIGS. 2-9. Additionally, storage 112 and/or memory 116 can store data and instructions for performing any of the methods described with reference to FIGS. 2-9. Storage 112 and/or memory 116 can be any non-transitory computer readable storage medium, such as a solid-state drive or a hard disk drive, among other possibilities. The vehicle control system 100 can also include a controller 120 capable of controlling one or more aspects of vehicle operation, such as controlling motion of the vehicle during autonomous parking in a parking lot.

In some examples, the vehicle control system 100 can be connected to (e.g., via controller 120) one or more actuator systems 130 in the vehicle and one or more indicator systems 140 in the vehicle. The one or more actuator systems 130 can include, but are not limited to, a motor 131 or engine 132, battery system 133, transmission gearing 134, suspension setup 135, brakes 136, steering system 137 and door system 138. The vehicle control system 100 can control, via controller 120, one or more of these actuator systems 130 during vehicle operation; for example, to open or close one or more of the doors of the vehicle using the door actuator system 138, to control the vehicle during autonomous driving or parking operations using the motor 131 or engine 132, battery system 133, transmission gearing 134, suspension setup 135, brakes 136 and/or steering system 137, etc. The one or more indicator systems 140 can include, but are not limited to, one or more speakers 141 in the vehicle (e.g., as part of an entertainment system in the vehicle), one or more lights 142 in the vehicle, one or more displays 143 in the vehicle (e.g., as part of a control or entertainment system in the vehicle) and one or more tactile actuators 144 in the vehicle (e.g., as part of a steering wheel or seat in the vehicle). The vehicle control system 100 can control, via controller 120, one or more of these indicator systems 140 to provide indications to a driver of the vehicle of one or more aspects of the automated parking procedure of this disclosure, such as successful identification of an empty parking space, or the general progress of the vehicle in autonomously parking itself.

Figure 2A:
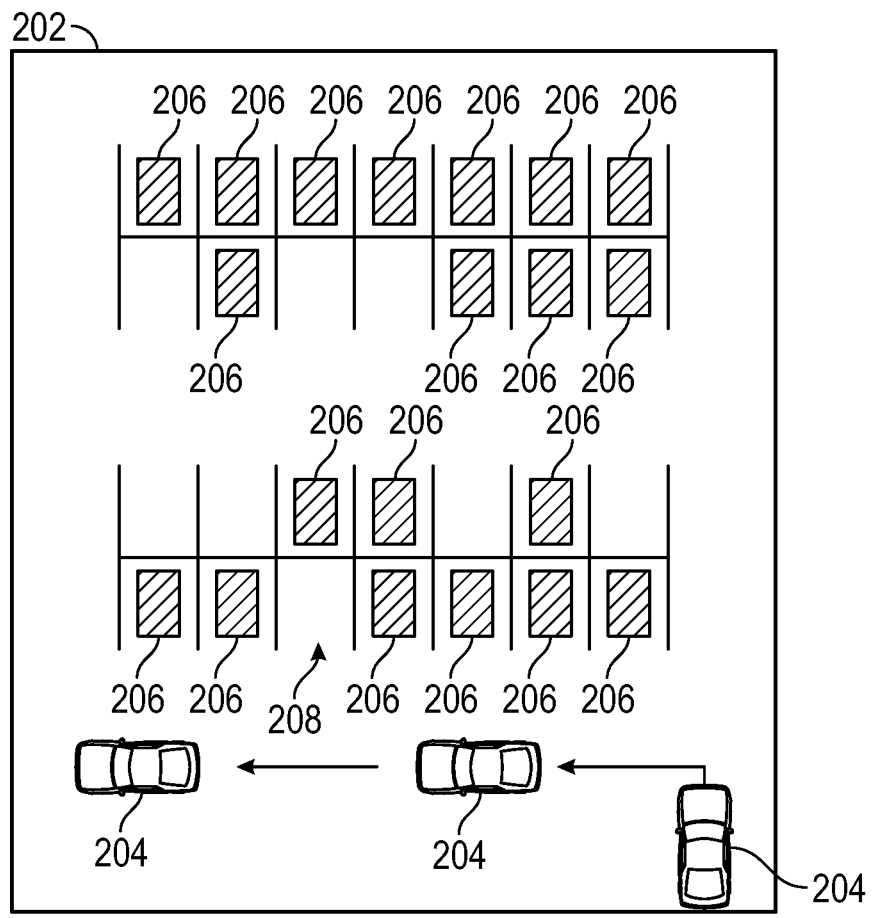
FIG. 2A illustrates an exemplary camera-based autonomous parking procedure according to examples of the disclosure.

FIG. 2A illustrates an exemplary camera-based autonomous parking procedure according to examples of the disclosure. In some examples, vehicle 204 can be positioned at an entrance of parking lot 202 or can have entered parking lot 202 (as illustrated in FIG. 2A). Parking lot 202 (or any other location that has parking lines, such as a road) can include one or more parking spaces delineated by pairs of parking lines formed on the ground (e.g., white lines formed on black asphalt), as illustrated. Some of the parking spaces can be occupied by parked cars 206. In some examples, at least one parking space 208 can be empty.

In some examples, a driver of vehicle 204 (or any other person associated with vehicle 204, or vehicle itself, autonomously) can initiate an autonomous parking procedure when vehicle 204 is positioned at the entrance of parking lot 202. In some examples, the driver of vehicle 204 can initiate the autonomous parking procedure at any location, not necessarily at the entrance of parking lot 202—in such examples, vehicle 204, if already inside parking lot 202, can initiate the autonomous parking procedure of the disclosure, and if outside of parking lot 202, can autonomously navigate to the entrance of parking lot 202 and then initiate the autonomous parking procedure. Once the autonomous parking procedure is initiated, vehicle 204 can begin autonomously moving through parking lot 202 to identify an empty parking space (e.g., parking space 208), and can autonomously park in that empty parking space. The autonomous parking procedure can be camera-based, and vehicle 204 can utilize one or more of its onboard range sensors (e.g., radar, LiDAR, ultrasonic, etc.), GPS receiver and/or other sensors, in conjunction with its onboard camera(s), to perform the autonomous parking procedure, as will be described in more detail below. As such, in response to a single input from a user (or from vehicle 204, itself), vehicle 204 can autonomously identify empty parking space 208, and can autonomously park in it.

Figure 2B:
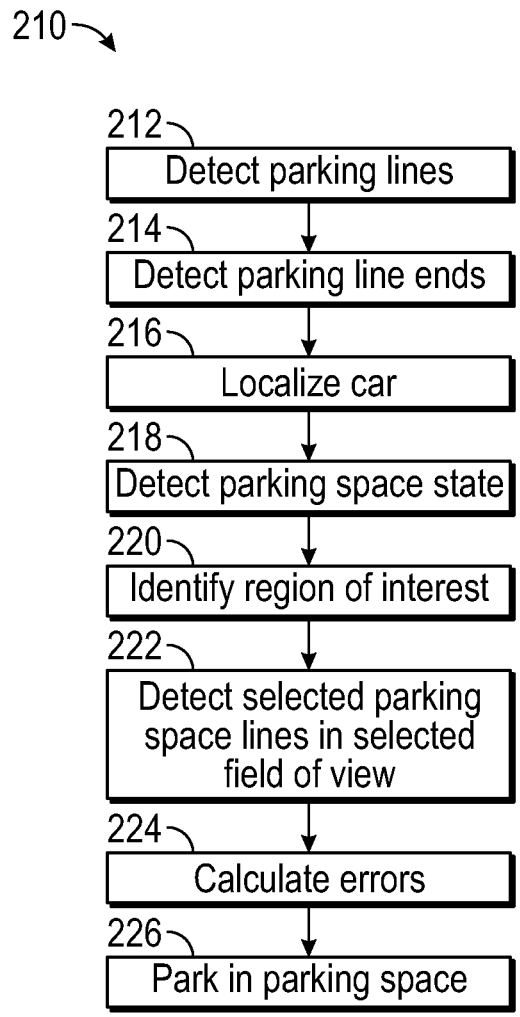
FIG. 2B illustrates an exemplary method for a camera-based autonomous parking procedure according to examples of the disclosure.

FIG. 2B illustrates exemplary method 210 for a camera-based autonomous parking procedure according to examples of the disclosure. Additional details of the steps of method 210 will be provided with reference to FIGS. 3-9, below. At 212, the vehicle can detect, in images/video captured by one or more of its onboard cameras (e.g., camera(s) 106), the locations of parking lines within a threshold distance of the vehicle (e.g., within the field(s)-of-view (FOV) of its one or more onboard cameras). In some examples, the camera(s) used by the vehicle in method 210 can be wide FOV camera(s), such as camera(s) having ~180 degree FOV. Further, in some examples, the camera(s) used by the vehicle in method 210 can be located on one side of the vehicle (e.g., the right side, or the left side). Step 212 will be described in more detail with reference to FIGS. 3A-3E.

At 214, the vehicle can detect the end points of one or more parking lines detected at step 212. Step 214 will be described below in more detail with reference to FIGS. 4A-4F.

At 216, the vehicle can localize itself within a map of the parking lot using the parking line ends detected at 214 and/or location determinations (e.g., determined by GPS 108). In some examples, the map of the parking lot can include information (e.g., map information 105) such as parking lot dimensions and parking line/parking space locations and dimensions. Further, in some examples, the map of the parking lot can be a predetermined map of the parking lot (e.g., a map that the vehicle downloads via an internet connection), or can be a map of the parking lot that the vehicle itself constructs. For example, the vehicle can drive (autonomously or otherwise) through the parking lot before performing the autonomous parking procedure of the disclosure, and using one or more of its onboard cameras, GPS, range sensors (e.g., included in sensor(s) 107), etc., can construct the map of the parking lot. Localizing the vehicle within the map of the parking lot can include determining the position and/or orientation of the vehicle within the map of the parking lot. Step 216 will be described in more detail with reference to FIGS. 5A-5D.

At 218, the vehicle can detect the state (e.g., empty, occupied, unknown) of one or more parking spaces in the parking lot. For example, the vehicle can utilize one or more of LiDAR, radar, ultrasonic, or other range sensors to determine whether a particular parking space within a threshold distance of the vehicle is empty, and if so, the vehicle's control system can utilize the coordinates of the empty parking space to autonomously park the vehicle in the empty parking space (e.g., using actuator systems 130) according to steps 220-226. Step 218 will be described in more detail with reference to FIGS. 6A-6G.

At step 220, the vehicle can calculate a region of interest corresponding to the selected empty parking space. The vehicle can rely on map data and one or more images captured by its one or more cameras to construct the region of interest (e.g., using onboard computer 110). Step 220 will be described in more detail with reference to FIGS. 7A-7D.

At step 222, the vehicle can detect the lines of the selected parking space within a selected field of view. In some examples, the selected field of view can be the field of view of a selected camera positioned to monitor the selected parking space throughout steps 220-226 of method 210. For example, the selected camera can be a rear camera for a rear-in parking maneuver or a front camera for a front-in parking maneuver. The lines can be detected using algorithms, steps, and methods similar to the details of steps 212 and 214 of method 210. Step 222 will be described in more detail with reference to FIGS. 8A-8B.

At step 224, the vehicle can calculate one or more errors in its position compared to a final parking position. In some examples, the error calculation(s) can be based on the vehicle's position determined in step 216, the region of interest determined in step 220, and/or the lines of the selected parking space detected in step 222. The error calculation(s) can inform the vehicle how to autonomously move into the selected parking space. Step 224 will be described in more detail with reference to FIGS. 9A-9E.

At 226, the vehicle can autonomously park itself in the empty parking space detected at step 218. In some examples, the vehicle can autonomously navigate to the coordinates of the empty parking space determined at 218 to autonomously park in the empty parking space. Autonomously parking the vehicle can comprise autonomously entering a parked state. The parked state can comprise applying a parking brake, turning off the motor 131 or engine 132 of the vehicle, and/or otherwise powering down the vehicle. During parking, the vehicle can continuously repeat steps 212, 214, 216, 218, 220, 222, and 224 to continuously detect and/or refine the location of the parking space, which can be delivered to, and for use by, the control system of the vehicle as the vehicle moves into the parking space.

Figure 3A:
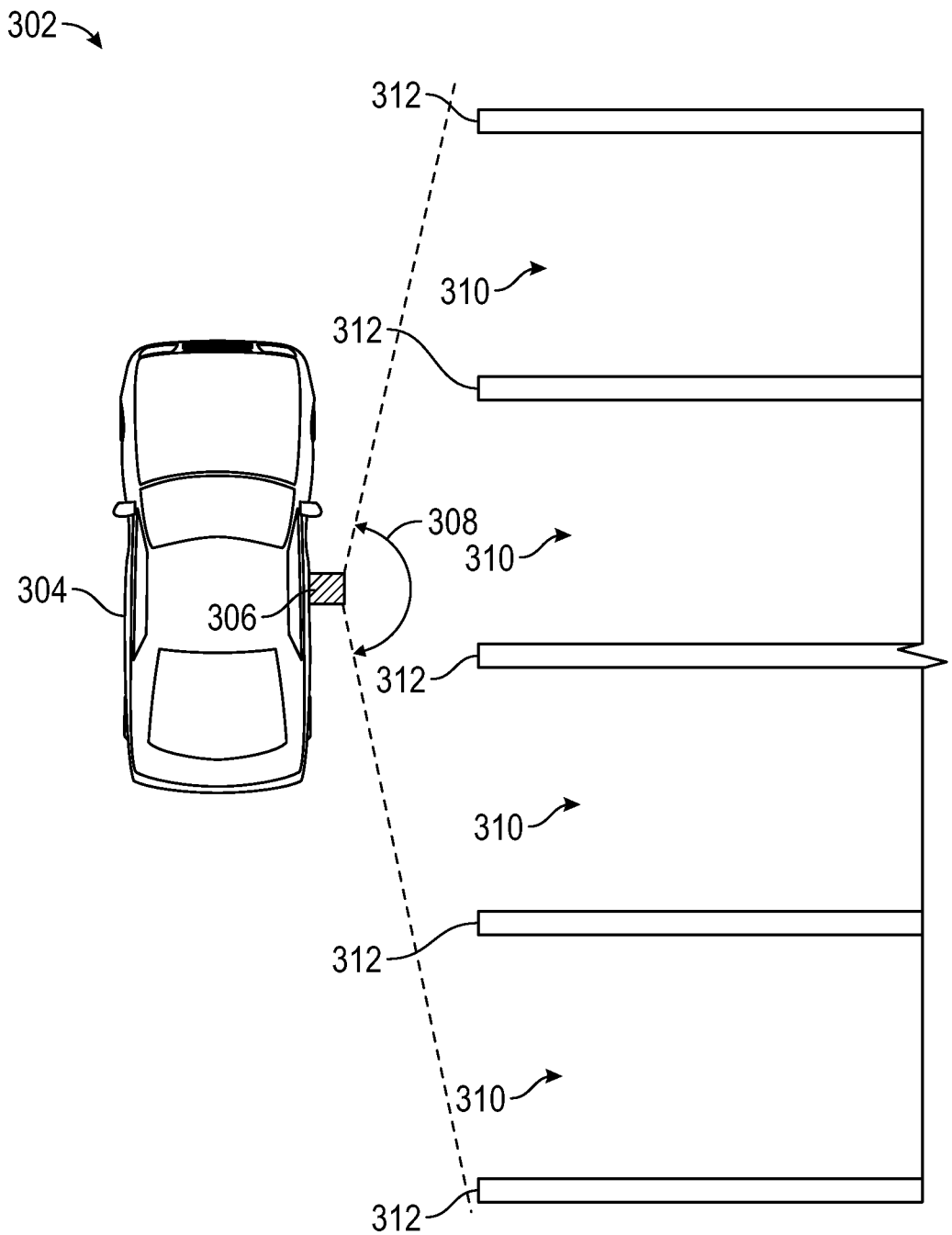
FIGS. 3A-3E illustrate exemplary details for detecting parking lines using a camera on a vehicle in a camera-based autonomous parking procedure according to examples of the disclosure.

FIGS. 3A-3E illustrate exemplary details for detecting parking lines using a camera on a vehicle in a camera-based autonomous parking procedure according to examples of the disclosure. FIGS. 3A-3E can correspond to step 212 in FIG. 2B, and the vehicle of the disclosure can continuously perform step 212 (as part of method 210) as it moves through the parking lot to identify an empty parking space. FIG. 3A illustrates vehicle 304 positioned alongside parking spaces 310 in parking lot 302, which can be delineated by parking lines 312. As previously discussed, in some examples, as part of the autonomous parking procedure of the disclosure, vehicle 304 can autonomously move along parking spaces 310 in parking lot 302 in search of an empty parking space in which to autonomously park (e.g., in a direction that is substantially perpendicular or otherwise non-parallel to parking lines 312). As vehicle 304 moves through the parking lot, vehicle 304 can identify parking lines 312 in its vicinity (e.g., within the FOV of camera 306) using onboard camera 306. In some examples, camera 306 can be mounted on one side of vehicle 304 (e.g., the right side of vehicle 304), and can be a wide FOV 308 camera, such as a fish-eye camera. As shown in FIG. 3A, camera 306 can capture images of one or more parking lines 312 to the right of vehicle 304 that are within FOV 308.

Figure 3B:
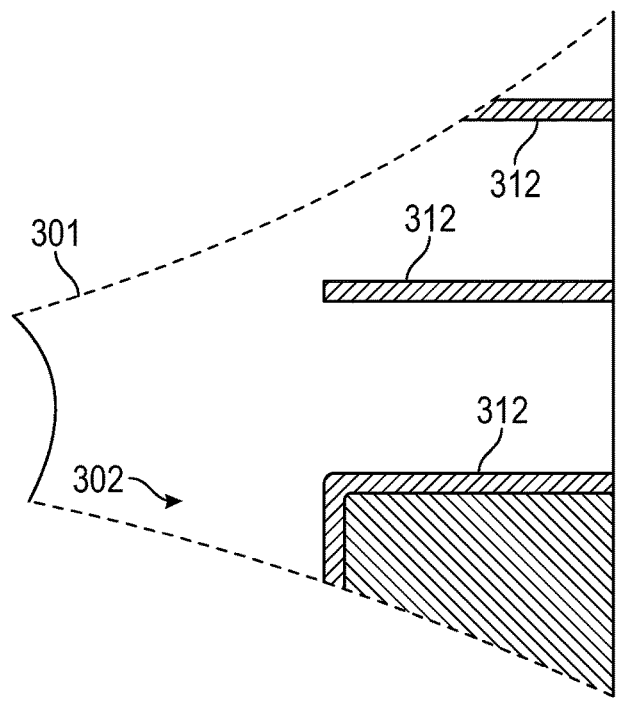

Once images of parking lines 312 are captured, as described in FIG. 3A, the images captured by camera 306 can be transformed such that the images look like they are captured from a camera looking down on vehicle 304 from above, as shown in FIG. 3B. For example, if camera 306 provides wide-FOV images towards the right side of vehicle 304, images captured by camera 306 may depict parking lines 312 as nonlinear and incorrectly oriented with respect to vehicle 304 and/or each other. Therefore, it can be beneficial to transform the images captured by camera 306 to present a top-down view of the surface of parking lot 302 in which parking lines 312 are linear (assuming they are actually linear) and accurately oriented with respect to vehicle 304 and/or each other. Image 301 in FIG. 3B can illustrate an exemplary image captured by camera 306 after being transformed as described above, and can be referred to as a "top image." Transforming the images captured by camera 306 into top images can cause features on the ground of parking lot 302 (e.g., parking lines 312) to appear accurately, while features above the ground of parking lot 302 may be distorted. Importantly, after the transformation, parking lines 312 in top image 312 can appear straight (assuming parking lines 312 are straight), and their orientation with respect to camera 306/vehicle 304 can be accurate (e.g., if vehicle 304 is oriented perpendicular to parking lines 312, and camera 306 is oriented parallel to parking lines 312, parking lines 312 in top image 301 can appear as horizontal lines, as shown in FIG. 3B). As such, top image 301 can provide an accurate depiction of features (e.g., dimensions, positions, orientations, etc. with respect to camera 306 and/or vehicle 304) on the ground of parking lot 302, such as parking lines 312, that are within FOV 308 of camera 306.

Any number of warping transformations known in the art can be used to create top image 301. The parameters of the warping transformation used by vehicle 304 can be determined according to intrinsic and/or extrinsic calibration parameters of camera 306, which can be determined by using standard calibration procedures known in the art. In some examples, several assumptions about the camera 306, the vehicle 304, and the vehicle's surroundings can be made to create the top image. For example, it can be assumed that the position of camera 306 relative to the ground is known and the ground is flat. Exemplary calibration procedures relating to distorting/transforming images captured by cameras are described in Shah, Shishir, and J. K. Aggarwal, "A simple calibration procedure for fish-eye (high distortion) lens camera," *IEEE International Conference on Robotics and Automation*, 1994, the contents of which are hereby incorporated by reference for all purposes.

After vehicle 304 creates top image 301, vehicle 304 can search for parking lines 312 inside top image 301. In some examples, vehicle 304 can search all of top image 301 for parking lines 312, and in some examples, vehicle 304 can select a sub-window of top image 301 in which to search for parking lines 312. The sub-window, if selected, can correspond to an area of parking lot 302 in the vicinity of vehicle 304 (e.g., on the right side of vehicle 304), such as an area that is eight meters wide and ten meters long (e.g., any-sized area in which multiple parking lines 312 can exist). The remainder of the disclosure will refer to image processing operations that vehicle 304 can perform on the entirety of top image 301 to detect parking lines 312, but it is understood that vehicle 304 can analogously perform such operations on a sub-window of top image 301, if selected. Vehicle 304 can search for parking lines 312 in top image 301 as described with reference to FIGS. 3C-3D.

Figure 3C:
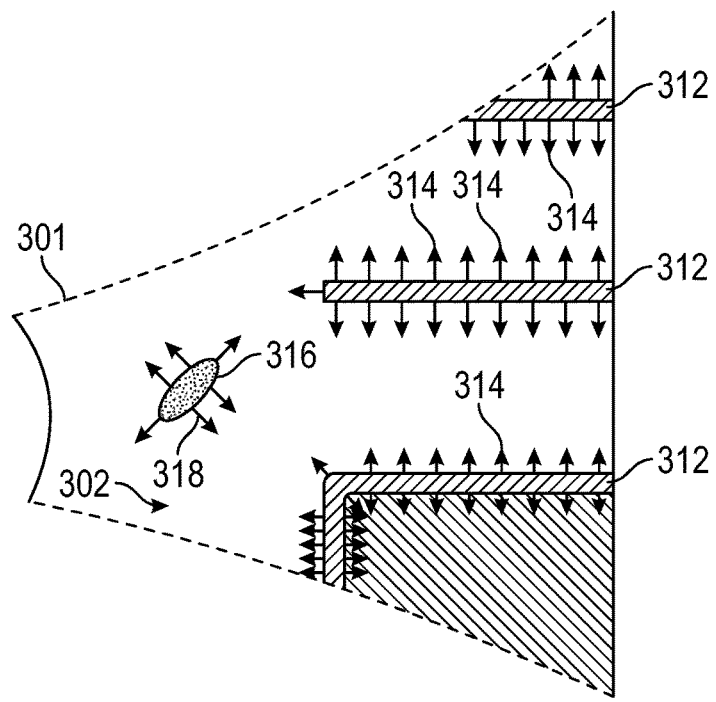

Specifically, vehicle 304 can apply a filter to top image 301 to calculate the magnitude and orientation of the image gradient at each pixel in top image 301, as shown in FIG. 3C. Any number of image gradient filters, such as a Sobel gradient filter, can be used. The image gradient can represent a directional change in the intensity or color in top image 301, and can reflect the magnitude and direction of such change. For example, parking lines 312 can be substantially white, and the surface of parking lot 302 can be substantially black (though in FIG. 3C, parking lines 312 are illustrated as being black, and the surface of parking lot 302 is illustrated as being white, for ease of illustration). Therefore, the image gradients at the boundaries of parking lines 312 and the surface of parking lot 302 can be relatively large, while the image gradient within a substantially uniformly-colored area of the surface of parking lot 302, or within substantially uniformly-colored area of parking lines 312, can be relatively small. FIG. 3C illustrates some exemplary image gradients 314 at the boundaries of parking lines 312 and the surface of parking lot 302. As shown in FIG. 3C, image gradients 314 can indicate the normal directions of the boundaries between parking lines 312 and the surface of parking lot 302 at the pixels located on or along those boundaries. Further, it is understood that the signs (positive or negative) of image gradients 314 depicted in FIG. 3C are exemplary only, and can be reversed as appropriate for a specific implementation of step 212 of method 210.

In the example of FIG. 3C, parking lot 302 also includes an imperfection 316 (e.g., a portion of parking lot 302 that is lighter than the remaining surface of parking lot 302). Vehicle 304 has also determined image gradients 318 associated with imperfection 316, as shown. Image gradients for other pixels in top image 301 are not illustrated, for ease of description.

Figure 3D:
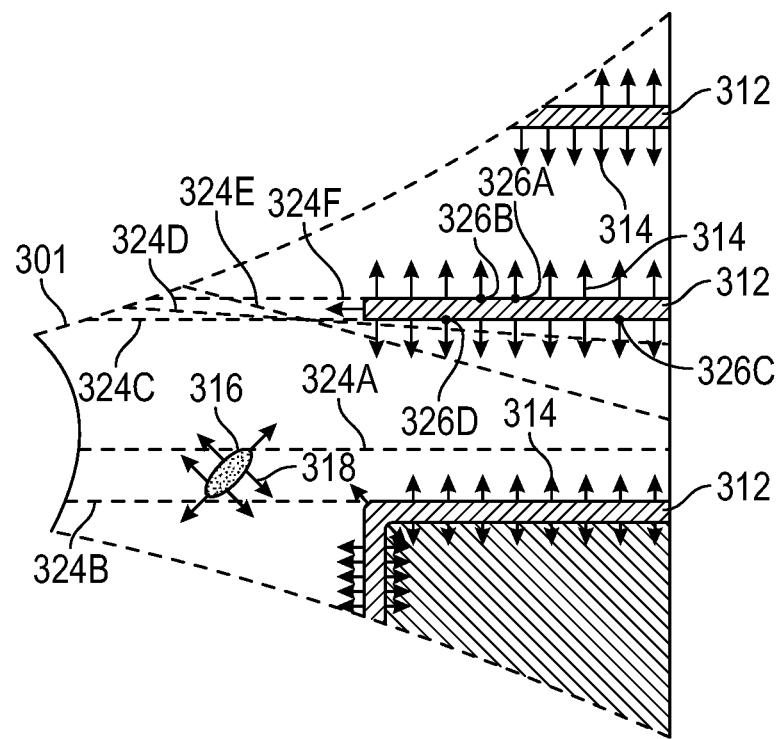
Figure 3D:
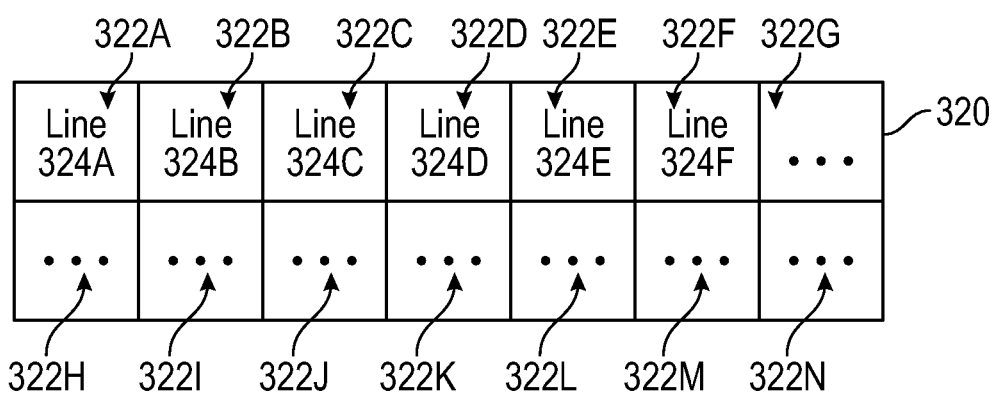

After determining the magnitudes and directions of image gradients 314/318 at pixels in top image 301, vehicle 304 can use the image gradients 314/318 to identify line(s) in top image corresponding to the boundaries of parking lines 312. For example, vehicle 304 can create a two-dimensional Hough transform table, as known in the art, to record scores for each potential parking line 312 in top image 301, as illustrated in FIG. 3D. These scores can be used to identify boundaries of parking lines 312 in top image 301, as will be described below. For example, in FIG. 3D, table 320 can represent an exemplary Hough transform table, and can include a plurality of cells 322. Each cell 322 of table 320 can correspond to a specific line in top image 301 (e.g., a line with a specific slope and position in top image 301). For example, cell 322A can correspond to line 324A, cell 322B can correspond to line 324B, cell 322C can correspond to line 324C, cell 322D can correspond to line 324D, cell 322E can correspond to line 324E, and cell 322F can correspond to line 324F. Other cells 322 in table 320 can similarly correspond to other lines 324 in top image 301 (not illustrated for ease of description). Table 320 can include sufficient cells 322 such that the line 324 angle resolution represented by table 320 can be 0.5 degrees, and the line 324 position resolution represented by table 320 can be one pixel in top image 301. In other words, table 320 can represent lines 324 at 0.5 degree slope increments and at single pixel position increments across top image 301. Other line 324 angle and line 324 position resolutions can also be implemented by table 320.

In some examples, vehicle 304 may only need to create table 320 for a limited range of line 324 angles (i.e., vehicle 304 may only need to search for parking lines 312 within a limited angle range), because vehicle 304 can be searching for parking lines 312 having a known orientation with respect to vehicle 304 (e.g., perpendicular to vehicle 304 or at another known angle with respect to vehicle 304). In some examples, vehicle 304 can know this orientation of parking lines 312 from the map of parking lot 302 described above. For example, vehicle 304 can search for parking lines 312 within +/−10 degrees of the expected or known orientation of parking lines 312, and therefore, can construct table 320 to only represent lines having slopes within +/−10 degrees of the expected or known orientation of parking lines 312.

Once table 320 is created, vehicle 304 can detect lines (e.g., corresponding to boundaries of parking lines 312) in top image 301 based on a voting algorithm. Specifically, one or more pixels in top image 301 can "vote" for certain cells 322 in table 320 depending on pixel and line properties, as will be described below. For example, in some examples, vehicle 304 can only allow for voting by pixels that have an image gradient magnitude that is larger than a threshold image gradient magnitude (e.g., 100 for a Sobel edge detector), so that only "strong" edges (e.g., pixels in edges that are likely to correspond to parking line 312 boundaries) in top image 301 may be allowed to vote in table 320.

For those pixels with image gradient magnitudes that are larger than the threshold image gradient magnitude ("voting pixels"), vehicle 304 can vote (e.g., provide a single vote unit) for all Hough cells 322 corresponding to lines 324 having normals that are within a certain angle range of those pixels, and cross within a certain number of pixels of those pixels (i.e., are within a certain distance of the voting pixels). In some examples, vehicle 304 can vote for Hough cells 322 that correspond to lines 324 having normals that are within +/−30 degrees of the gradient directions of the voting pixels, and within +/−3 pixels of the locations of the voting pixels, though other voting criteria may similarly be used. It should be noted that in some examples, table 320 only has cells 322 that correspond to a limited range of line angles, as described above; therefore, voting may only be possible for lines within that limited range of line angles.

For example, in FIG. 3D, pixels 326A, 326B, 326C and 326D can have image gradient magnitudes larger than the image gradient magnitude threshold. Pixels 326A and 326B can vote for cell 322F (corresponding to line 324F) in table 320, because line 324F can be within a threshold number of pixels of pixels 326A and 326B, and pixels 326A and 326B can have image gradient directions that are within a threshold degree range of the normal of line 324 (e.g., the gradient directions of pixels 326A and 326B can be substantially parallel to the normal of line 324F). Pixels 326C and 326D can similarly vote for cell 322C (corresponding to line 324C) in table 320 for similar reasons. With respect to line 324D, pixel 326D can vote for cell 322D (corresponding to line 324D), because line 324D can be within a threshold number of pixels of pixel 326D, and pixel 326D can have a gradient direction that is within a threshold degree range of the normal of line 324D. However, pixel 326C may not vote for cell 322D (corresponding to line 324D), because while line 324D can have a normal that is within the threshold degree range of the image gradient direction of pixel 326C, line 324D may not be within the threshold number of pixels of pixel 326C. No pixels may vote for cell 322E (corresponding to line 324E), because the above conditions may not be met for any pixels in top image 301. One or more pixels on the lower parking line 312 in top image 301 may vote for cell 322B (corresponding to line 324B) in accordance with the above conditions, and one or more pixels on imperfection 316 may similarly vote for cell 322A (corresponding to line 324A) in accordance with the above conditions.

Because parking lines 312 can be composed of two lines with opposing image gradients (e.g., upper boundaries and lower boundaries of parking lines 312), parking line 312 detection can be improved if each voting pixel in top image 301 votes, not only for its line(s)/cell(s) in accordance with the above conditions, but also for line(s)/cell(s) that correspond to the other boundary of the parking line 312 on which the voting pixels are located. For example, pixels 326A and 326B, in addition to voting for cell 322F (corresponding to line 324F), can each also vote for cell 322C (corresponding to line 324C), because line 324C can have a normal direction that is 180 degrees (in some examples, +/−5 degrees or some other range amount) rotated with respect to the image gradients of pixels 326A and 326B, and line 324C can be a threshold distance (in some examples, within some range amount of the threshold distance) away from pixels 326A and 326B (e.g., 15 cm or some other distance corresponding to the width of parking lines 312). Pixels 326C and 326D can similarly also vote for cell 322F (corresponding to line 324F). Other voting pixels in top image 301 can similarly vote for a second cell/line in accordance with the above conditions.

After the voting eligible pixels in top image 301 vote for cell(s)/line(s) in accordance with the above, vehicle 304 can identify line(s) that likely correspond to the upper/lower boundaries of parking lines 312 based on the results of the voting. For example, vehicle 304 can identify the cell 322 in table 320 with the greatest number of votes, which can correspond to and provide the parameters (e.g., slope and position) of the strongest detected line in top image 301; this line, in turn, can correspond to a parking line 312 boundary in top image 301. Then, vehicle 304 can clear out (or zero out) the voting results for a certain number of cells/lines in the vicinity of the identified cell/line, because other lines with similar positions and slopes likely may not correspond to another boundary of a parking line 312; other parking line 312 boundaries in top image 301 are likely at least 15 cm (or another distance corresponding to the width of a parking line 312) away from the boundary line identified above. Vehicle 304 can then identify another cell/line with the next-highest vote total, which can correspond to and provide the parameters of the next strongest detected line in top image 301. Vehicle 304 can, again, clear the voting results for a certain number of cells/lines in the vicinity of the identified line. Vehicle 304 can continue the above steps until a certain number of lines have been detected (e.g., 15, 20 or 30 lines). For example, vehicle 304 may identify lines 324A, 324B, 324C and 324F as potential boundaries of parking lines 312 after completing the above steps.

In some examples, after identifying potential parking line 312 boundary lines, as described above, vehicle 304 can rank these lines based on their voting scores, and can remove lines from contention that have voting scores less than a certain voting score threshold. In some examples, vehicle 304 can additionally or alternatively remove lines from contention that have voting scores that are less than half of the highest voting score for identified lines in the current top image 301 frame (camera 306 can continuously capture images/frames of the surroundings of vehicle 304, and the parking line detection procedure of FIGS. 3A-3E can be performed on each image/frame captured by camera 306). For example, vehicle 304 can remove line 324A from contention as a potential boundary of a parking line 312, because its voting score can be less than the voting score threshold, and/or less than half of the highest voting score for top image 301 (e.g., because only pixels on imperfection 316 may have voted for line 324A).

After performing the above, in some examples, vehicle 304 can eliminate lines from contention that are separated by distances other than specified distances (or distance ranges within those specified distances). For example, lines corresponding to the two boundaries of a parking line 312 should be separated from each other by a certain distance (e.g., 15 cm, or another expected parking line width), and lines corresponding to boundaries of parking lines 312 on either side of a parking space should be separated from each other by another certain distance (e.g., 2.75 m, or another expected parking space width). Therefore, vehicle 304 can eliminate lines from contention that are not within 15 cm or 2.75 m of another detected line, for example. The remaining lines after performing the above can correspond to the detected boundaries of parking lines 312 in top image 301.

Figure 3E:
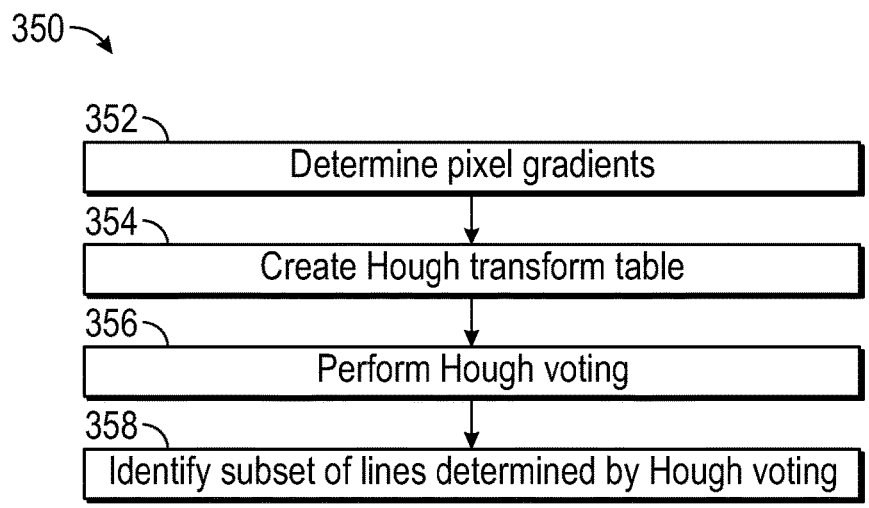

FIG. 3E illustrates an exemplary method 350 of detecting lines in top image 301 that correspond to parking line 312 boundaries according to examples of the disclosure. Method 350 can correspond to the examples described with reference to FIGS. 3A-3D. At 352, vehicle 304 can determine image gradients for pixels in top image 301 (e.g., as described with reference to FIG. 3C). At 354, vehicle 304 can create a Hough transform table for use in pixel voting to identify lines in top image 301 that correspond to boundaries of parking lines 312 (e.g., as described with reference to FIG. 3D). At 356, vehicle 304 can perform Hough voting for one or more lines/cells in correspondence with one or more pixels in top image 301 (e.g., as described with reference to FIG. 3D). At 358, vehicle 304 can identify a subset of the lines represented by the Hough table as lines corresponding to boundaries of parking lines 312 in top image 301 (e.g., as described with reference to FIG. 3D).

After vehicle 304 detects a collection of lines corresponding to parking line 312 boundaries in top image 301, vehicle 304 can utilize those lines as indications of local regions in top image 301 in which vehicle 304 can search for the end of each parking line 312. Specifically, after detecting lines as in FIGS. 3A-3E, vehicle 304 may be able to determine the vertical distance/orientation of those lines with respect to a reference point on vehicle 304 based on the parameters (e.g., slope and position) of those lines (e.g., with respect to the center of the rear axle of vehicle 304, or any other known reference point used by vehicle 304 as a reference for a coordinate system). However, vehicle 304 may not yet have knowledge of the positions of the ends of parking lines 312 with which to localize itself with respect to the parking spaces in parking lot 302. Therefore, vehicle 304 can utilize the lines detected in FIGS. 3A-3E to determine the locations of the end points of parking lines 312, as will be described below.

FIGS. 4A-4F illustrate exemplary details for detecting the locations of the ends of parking lines 312 in a camera-based autonomous parking procedure according to examples of the disclosure. FIGS. 4A-4F can correspond to step 214 in FIG. 2B, and the vehicle of the disclosure can continuously perform step 214 (as part of method 210) as it moves through the parking lot to identify an empty parking space. After detecting lines in FIGS. 3A-3E, vehicle 304 can group the detected lines into pairs (e.g., pairs corresponding to the upper/lower boundaries of parking lines 412). Specifically, the detected lines can be grouped into pairs based on a specific distance requirement (e.g., 15 cm, corresponding to the average or expected width of a parking line 412); in other words, a first detected line can be paired with a second detected line that is separated from the first detected line by the specific distance requirement. If one or more detected lines are not paired at this stage (e.g., because no other detected lines are separated from those lines by the specific distance), those unpaired detected lines can be ignored by vehicle 304 in determining parking line 412 end point locations below.

Figure 4A:
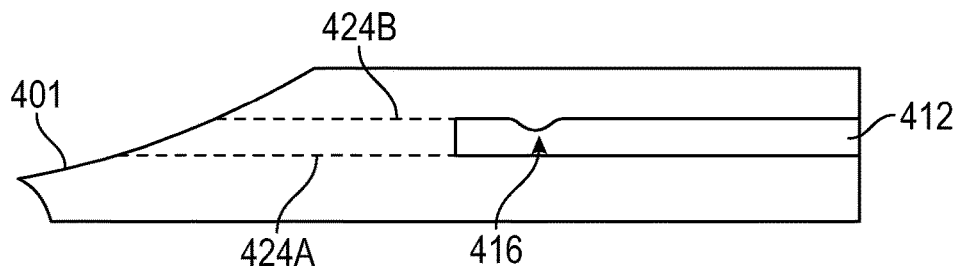
FIGS. 4A-4F illustrate exemplary details for detecting the locations of the ends of parking lines in a camera-based autonomous parking procedure according to examples of the disclosure.

After pairing the detected lines, vehicle 304 can, for each pair of detected lines, select sub-regions of top image 301 that include the detected lines, as well as a certain amount of additional image area above and below the pairs of detected lines. Each of these sub-regions can be referred to as a "line pair patch." FIG. 4A illustrates exemplary line pair patch 401 that includes the pair of detected lines 424A and 424B. Line pair patch 401 also includes parking line 412, and lines 424A and 424B can correspond to the upper and lower boundaries of parking line 412, as shown. Parking line 412 can include imperfection 416, which can correspond to a worn or otherwise damaged or occluded portion of parking line 412. Line pair patch 401 can extend the entire width of top image 301, and a certain number of pixels above line 424B (e.g., eight pixels), and a certain number of pixels below line 424A (e.g., six pixels). In some examples, vehicle 304 can filter line pair patch 401 with a noise-reducing filter (e.g., a noise-reducing 2-D median filter of size 5×5).

Figure 4B:
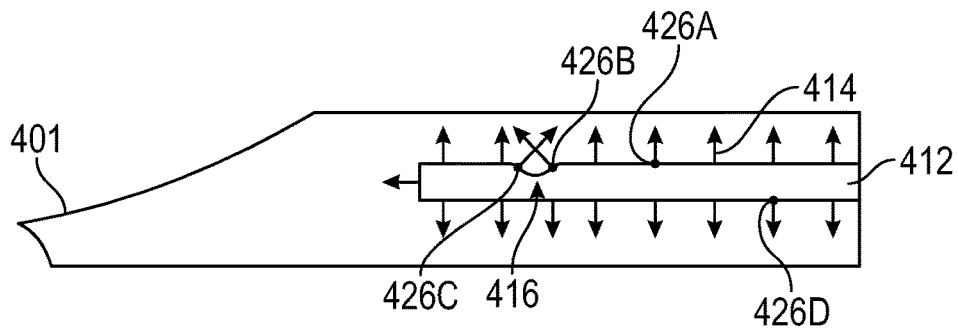

Next, vehicle 304 can identify the pixels in line pair patch 401 that make up the top and bottom edges of parking line 412. Specifically, vehicle 304 can determine the image gradient magnitude and orientation at each pixel in line pair patch 401 (e.g., by convolving a filter over line pair patch 401 that calculates the image gradient at each pixel, similar to as described with reference to FIG. 3C), as shown in FIG. 4B. For example, vehicle 304 can determine image gradients 414 for pixels in line pair patch 401, including pixels 426A, 426B, 426C and 426D. Only image gradients 414 for pixels on parking line 412 are illustrated for ease of description, though it is understood that vehicle 304 can determine the image gradients of other pixels in line pair patch 401 as well. Pixels 426A, 426B and 426C can be located on the top boundary of parking line 412 (though pixels 426B and 426C can be located on imperfection 416), and pixel 426D can be located on the bottom boundary of parking line 412. Vehicle 304 can differentiate pixels that correspond to the top and bottom edges of parking line 412 based on the image gradient orientations of those pixels. For example, pixels with image gradients within a first range of orientations (e.g., orientations corresponding to the top edge of parking line 412) can be determined to correspond to the top edge of parking line 412, and pixels with image gradients with a second range of orientations (e.g., orientations corresponding to the bottom edge of parking line 412, ~180 rotated with respect to the range of orientations corresponding to the top edge of parking line 412) can be determined to correspond to the bottom edge of parking line 412. For example, vehicle 304 may eliminate pixels 426B and 426C as edge pixels, because they may not satisfy the image gradient orientation requirements, above. Additionally, vehicle 304 can eliminate pixels from contention that have image gradient magnitudes that are less than an image gradient threshold, because only parking line 412 edge pixels may be of interest to vehicle 304. All pixels in line pair patch 401 that meet the above orientation criteria and have an image gradient magnitude that is larger than the image gradient threshold can be determined to belong to the top and bottom edges, respectively, of parking line 412.

Figure 4C:
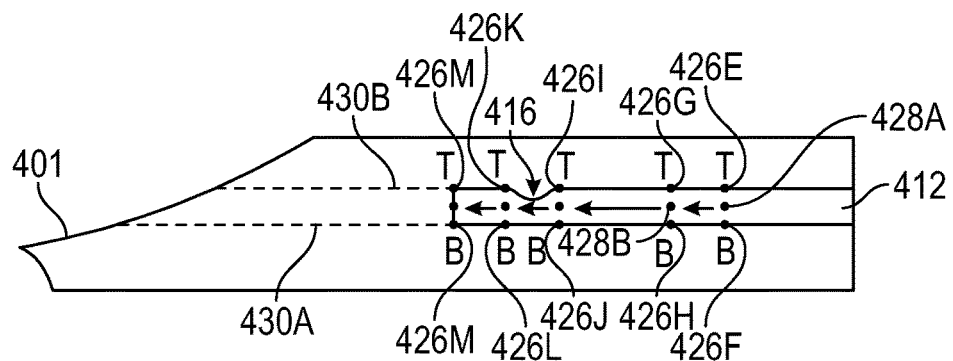
Figure 4D:
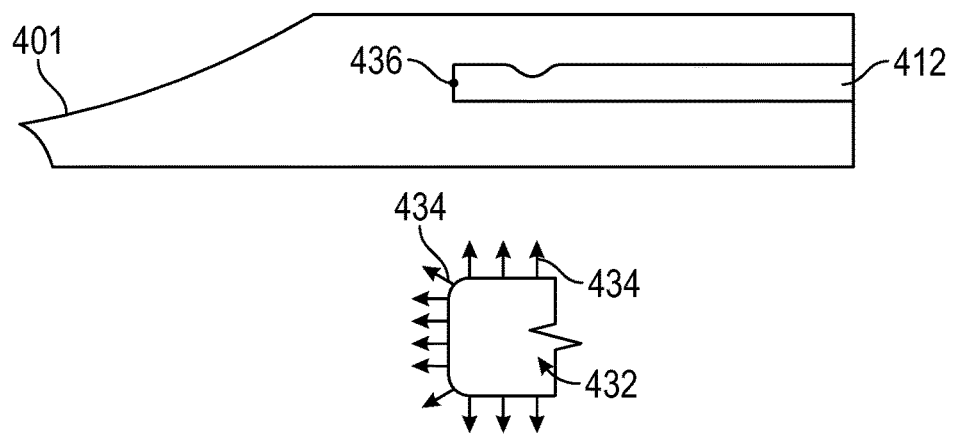

Next, vehicle 304 can pair top and bottom edge pixels along pixel columns in line pair patch 401, as illustrated in FIG. 4C. For example, vehicle 304 can utilize a template that is matched when two pixels in a given column of pixels are separated by a certain distance (e.g., a certain number of pixels, such as three, four or five pixels, corresponding to the width of parking line 412). Using such a template, vehicle 304 can start from the right-most identified edge pixels, and can move leftward in line pair patch 401 to determine whether (and/or the degree to which) the identified edge pixels match the template. Then, vehicle 304 can identify the location (e.g., row/column) in line pair patch 401 at which the identified top/bottom edge pixels most closely match the template. Vehicle 304 can use this location (e.g., location 428A) as a starting point for the steps that follow. Specifically, at starting point 428A, vehicle 304 can search for a top edge pixel above starting point 428A (e.g., pixel 426E), and a bottom edge pixel below starting point 428A (e.g., pixel 426F), and can check if the column of pixels in which starting point 428A is located also includes non-edge pixels (e.g., pixels not labeled as edge pixels in FIG. 4B) above and below the top and bottom edge pixels (e.g., pixels 426E and 426F, respectively). If so, vehicle 304 can store the top-most and bottom-most edge pixel locations for the current pixel column (e.g., the locations for pixels 426E and 426F, respectively) for use later in creating linear models corresponding to the top and bottom edges of parking line 412.

Then, vehicle 304 can use the pixel row of the center location (e.g., location 428A) between the stored top-most and bottom-most edge pixels from the current pixel column as a starting center point for the next pixel column closest to vehicle 304 (e.g., the pixel column to the left of the current pixel column that includes pixels 426E and 426F in line pair patch 401). Vehicle 304 can then repeat the above-described process of searching for and storing a top-most and bottom-most edge pixel in that pixel column (e.g., pixels 426G and 426H), identifying a center pixel location for that pixel column (e.g., location 428B), and moving to the next pixel column closest to vehicle 304 for all columns in line pair patch 401 that include edge pixels identified in FIG. 4B, such that all of line pair patch 401 is explored for top and bottom edge pair locations.

In some examples, while searching for top and bottom edge pixel pairs, vehicle 304 can bridge gaps along the top or bottom edges of parking line 412 up to an upper limit of pixels (e.g., 100 pixels). For example, because of imperfection 416 in parking line 412, a gap of top edge pixels may exist. While performing the above-described steps, vehicle 304 can disregard this gap (in some examples, up to an upper limit), and can continue past this gap in determining top and bottom edge pixel pairs, as described above. Bridging such gaps can improve parking line 412 detection in circumstances where one or more portions of a parking line 412 are occluded or missing.

If vehicle 304 identifies greater than a threshold number of top/bottom edge pixel pairs above (e.g., 10, 15 or 20 top/bottom edge pixel pairs), vehicle 304 can check one or more characteristics of those pixel pairs to validate that the pixel pairs correspond to a parking line 412 and/or exhibit the characteristics of a parking line 412. For example, vehicle 304 can determine whether one or more (or all) of the following conditions are met for the identified edge pixel pairs: 1) the variance in the locations (e.g., in a specific dimension, such as the vertical dimension) of all of the top edge pixels in the top/bottom edge pixel pairs is less than a threshold amount (e.g., one pixel); 2) the variance in the locations (e.g., in a specific dimension, such as the vertical dimension) of all of the bottom edge pixels in the top/bottom edge pixel pairs is less than a threshold amount (e.g., one pixel); and 3) the variance of the difference between the locations (e.g., in a specific dimension, such as the vertical dimension) of the top and bottom edge pixels in all of the top/bottom edge pixel pairs is less than a threshold amount (e.g., two pixels).

If the top/bottom edge pixel pairs meet one or more (or all) of the conditions above, vehicle 304 can fit the top edge pixels in the pairs to a top linear model 430B, and the bottom edge pixels in the pairs to a bottom linear model 430A. Once vehicle 304 determines the top and bottom linear models, vehicle 304 can discard those edge pixel pairs that include edge pixels that are greater than a threshold distance (e.g., two pixels) away from the locations of the top or bottom linear models (e.g., because those edge pixels may poorly approximate the actual boundaries of parking line 412).

In some examples, the top and bottom boundaries of parking line 412 can be substantially parallel. Further, vehicle 304 can know the expected orientation of parking lines 412 in top image 301/line pair patch 401. Therefore, if the difference in slope of the top 430B and bottom 430A linear models exceeds a certain threshold difference (e.g., one, two or three), the collection of top/bottom edge pixels pairs that vehicle 304 identified above can be discarded by vehicle 304. Similarly, if the slope of either the top 430B or bottom 430A linear models deviates from the expected orientation of parking lines 412 by greater than a threshold amount, the collection of top/bottom edge pixels pairs that vehicle 304 identified above can be discarded by vehicle 304.

After performing the above steps, the collection of top/bottom edge pixels pairs can be candidate pixel pairs for an actual parking line 412. Next, vehicle 304 can determine the location of the end of the parking line 412 as will be described with reference to FIG. 4D. Specifically, vehicle 304 can start searching for a short line segment (e.g., corresponding to the line segment comprising the end of parking line 412) that is orthogonal (or substantially orthogonal) to top linear model 430B and bottom linear model 430A. Vehicle 304 can start this search from the left-most (e.g., closest to vehicle 304) pair of top/bottom edge pixels, and can move leftward (e.g., towards vehicle 304) all the way to the end (e.g., left end) of line pair patch 401. To find the end 436 of parking line 412, vehicle 304 can utilize template 432 that specifies particular image gradient directions and magnitudes for pixels that would be located in the vicinity of the end 436 of parking line 412; specifically, pixels that would be located on the top edge of parking line 412 (e.g., within a certain distance of the end 436 of parking line 412), located on the end 436 of parking line 412, and located on the bottom edge of parking line 412 (e.g., within a certain distance of the end 436 of parking line 412). Vehicle 304 can compare template 432 to the image gradient orientations and magnitudes of pixels in line pair patch 401 between the left-most (e.g., closest to vehicle 304) top/bottom edge pixel pair and the edge of line pair patch 401 that is closest to vehicle 304. After performing this comparison to template 432, vehicle 304 can identify the pattern of pixels in line pair patch 401 that most closely match the orientation and magnitude of template 432 as being pixels that make up the end of parking line 412 (e.g., the end of parking line 412 including end point 436).

Figure 4E:
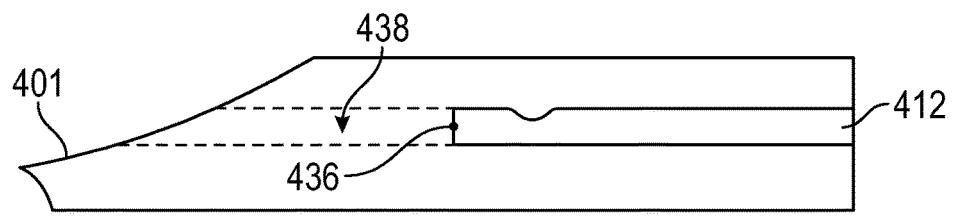

In some examples, vehicle 304 can further validate that the above-identified pattern of pixels indeed makes up the end 436 of parking line 412 by performing a pixel intensity variance check, as illustrated in FIG. 4E. For example, vehicle 304 can compare the intensity variance of all pixels to the left of end point 436 in line pair patch 401 (e.g., in region 438) to an intensity variance model of pixels on the surface of the road/parking lot. The intensity variance model of pixels on the surface of the road can be built up from road surface pixels relative to their direction and distance from camera 306 along the direction of travel of vehicle 304 in parking lot 302. If the intensity variance of the pixels in region 438 exceeds the variance model of pixels on the surface of the road, end point 436 can be discarded by vehicle 304 as a candidate end point, because if the intensity variance of the pixels in region 438 exceeds the variance model of pixels on the surface of the road, this can indicate that end point 436 may not truly correspond to the end of parking line 412, but rather may correspond to some other feature on the surface of parking lot 302 or on another vehicle in parking lot 302.

Pairs of detected lines (e.g., lines detected in FIGS. 3A-3E) in top image 301 that do not endure the steps described above with reference to FIGS. 4A-4E can be determined by vehicle 304 to not correspond to a parking line 412.

Figure 4F:
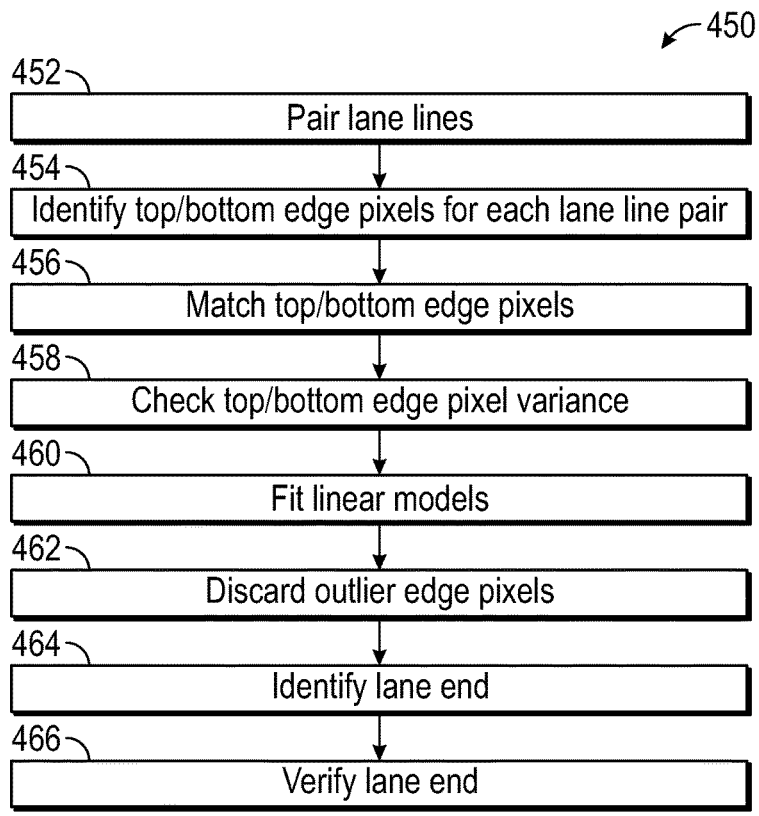

FIG. 4F illustrates an exemplary method 450 of detecting end point(s) of parking line(s) in top image 301 according to examples of the disclosure. Method 450 can correspond to the examples described with reference to FIGS. 4A-4E. At 452, vehicle 304 can pair top and bottom lines corresponding to parking line 412 boundaries (e.g., as described with reference to FIG. 4A). At 454, vehicle 304 can identify top and bottom edge pixels on boundaries of parking lines 412 for each top/bottom line pair (e.g., as described with reference to FIG. 4B). At 456, vehicle 304 can match top and bottom edge pixels with one another (e.g., as described with reference to FIG. 4C). At 458, vehicle 304 can check top and bottom edge pixel variance to ensure the variance falls within a specified variance threshold (e.g., as described with reference to FIG. 4C). At 460, vehicle 304 can fit linear models to the identified top and bottom edge pixels (e.g., as described with reference to FIG. 4C). At 462, vehicle 304 can discard outlier edge pixels based on the linear models (e.g., as described with reference to FIG. 4C). At 464, vehicle 304 can identify the end of a parking line 412 (e.g., as described with reference to FIG. 4D). At 466, vehicle 304 can verify the identified end of the parking line 412 (e.g., as described with reference to FIG. 4E).

After identifying the end point(s) 436 of parking line(s) 412 in top image 301 (e.g., as described with reference to FIGS. 4A-4F), vehicle 304 can use those end point(s) as well as GPS data to determine its position and orientation in parking lot 302, as will be described with reference to FIGS. 5A-5D. Specifically, as will be described below, vehicle 304 can utilize a map of parking lot 302 (which can include at least positions of parking line-ends in parking lot 302), and can fuse multiple sources of position measurements (e.g., GPS and parking line-end determinations) to determine its position and orientation in parking lot 302.

Figure 5A:
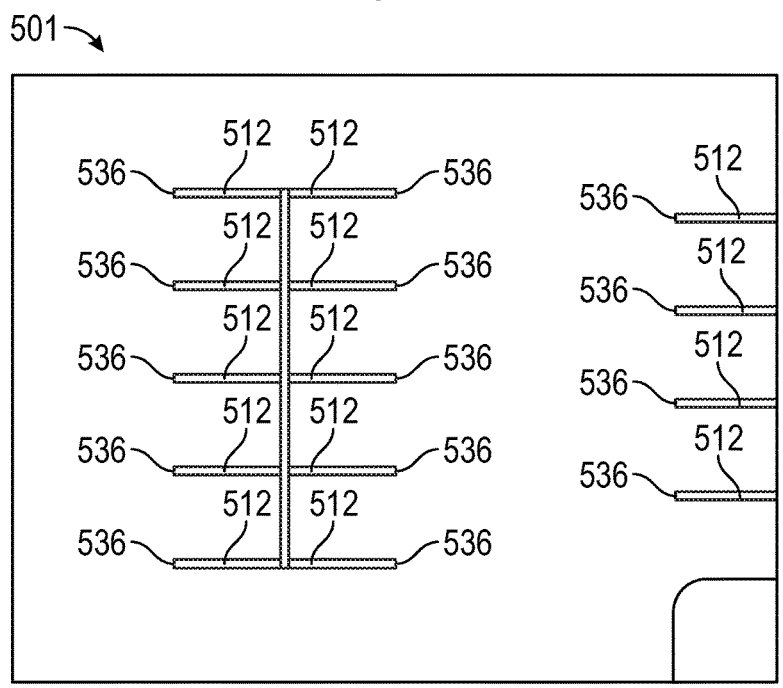
FIGS. 5A-5D illustrate exemplary details for localizing a vehicle in a parking lot using parking line end points and GPS measurements according to examples of the disclosure.

FIGS. 5A-5D illustrate exemplary details for localizing vehicle 304 in parking lot 302 using parking line 512 end points 536 and GPS measurements according to examples of the disclosure. FIGS. 5A-5D can correspond to step 216 in FIG. 2B, and the vehicle of the disclosure can continuously perform step 216 (as part of method 210) as it moves through the parking lot to identify an empty parking space. FIG. 5A illustrates exemplary map 501 of parking lot 302. In some examples, map 501 can include location(s) of end point(s) 536 of parking lines 512. In some examples, map 501 can also include orientation information for parking lines 512, dimensions of parking lot 302 and/or parking lines 512, and/or other information that may describe the physical layout of parking lot 302. In some examples, map 501 may be predefined (e.g., provided by a third party source via an internet connection at vehicle 304), or can be constructed by vehicle 304 itself while in parking lot 302.

Figure 5B:
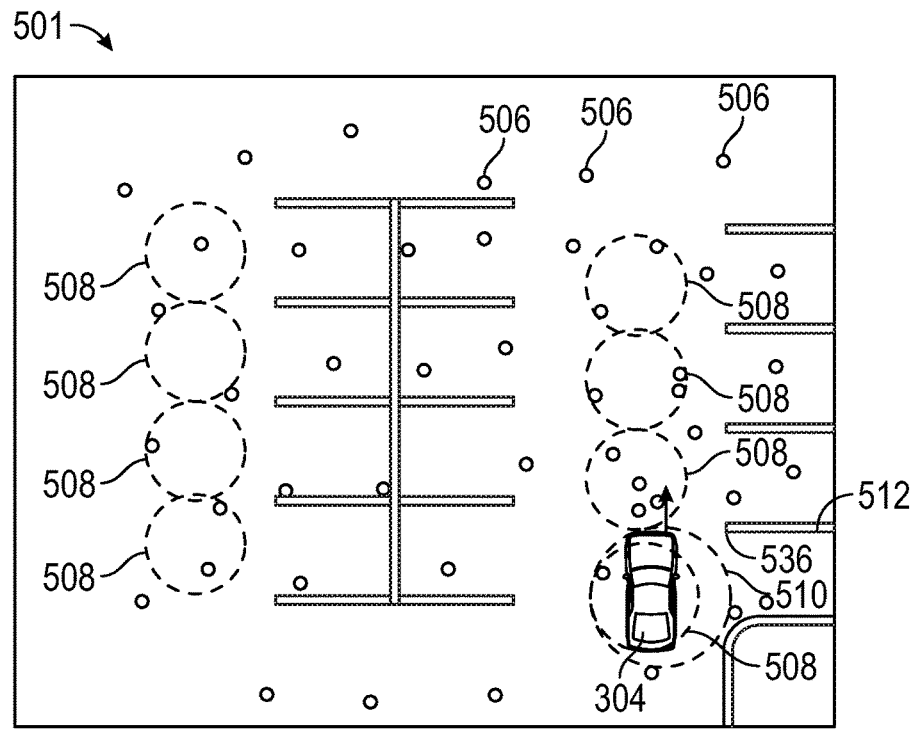
Figure 5C:
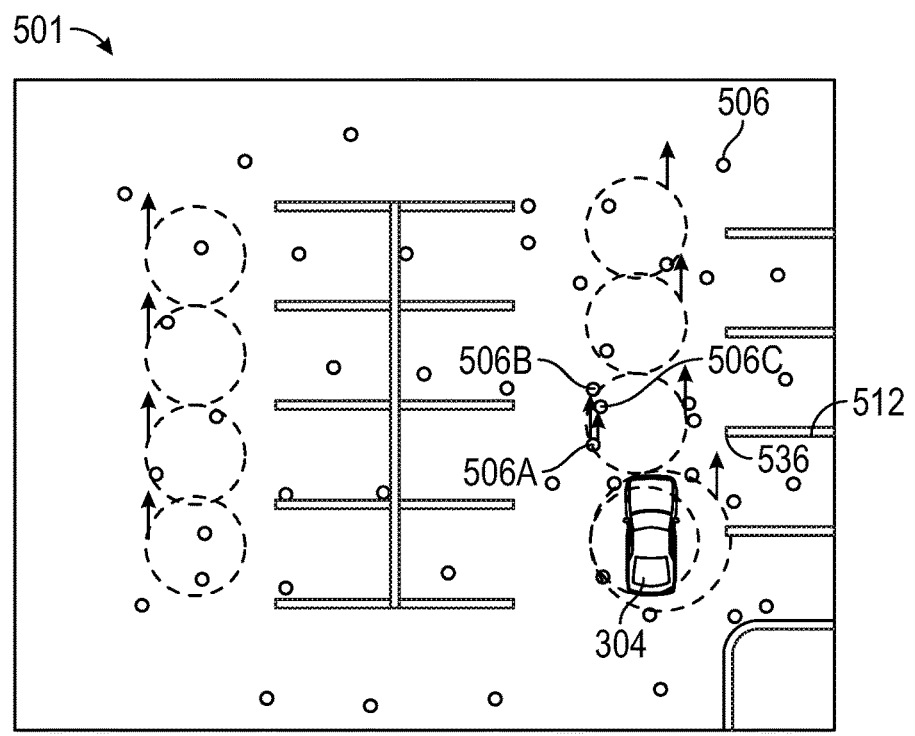

To localize itself within parking lot 302, vehicle 304 can initialize a plurality of candidate vehicle locations 506 (also referred to as "particles) at random positions across the entirety of map 501, as shown in FIG. 5B. In some examples, the number of particles 506 initialized by vehicle 304 in map 501 can be predetermined or based on the size of parking lot 302/map 501 (e.g., more particles 506 for a larger map 501, and fewer particles 506 for a smaller map). Each particle 506 can correspond to a candidate vehicle position and orientation in map 501.

After initializing particles 506, as described above, vehicle 304 can assign probabilities to particles 506 based on end points 536 of parking lines 512 (e.g., as determined in FIGS. 4A-4F) and GPS measurements. Specifically, vehicle 304 can determine its location relative to the end points 536 of parking lines 512 determined in FIGS. 4A-4F (e.g., three feet to the left of an end point 536 of a parking line 512). For each location in map 501 that corresponds to this relative location of vehicle 304 with respect to the identified end points 536, vehicle 304 can assign particles 506 that fall within a circle 508 of a given radius or other area of a given size (e.g., corresponding to the error expected from parking line 512 end 536 detection in FIGS. 4A-4F) a higher probability than particles 506 that fall outside of the circle 508. In some examples, every particle 506 inside the circle 508 can be assigned the same high probability, while the probabilities assigned outside of the circle 508 can gradually change from the high probability at the edge of the circle 508 to zero probability as the particles 506 are further and further from the circle 508. In some examples, because vehicle 304 may only be capturing images of a subset of parking lines 512 in parking lot 302, and thus subset of parking line 512 ends 536, at any given moment in time, the relative location that vehicle 304 determines with respect to the end points 536 of parking lines 512 may not be unique, and multiple locations in map 501 may correspond to the determined relative location of vehicle 304 (e.g., as illustrated in FIG. 5B). In some examples, as vehicle 304 captures images of more parking lines 512 at any moment in time, the number of locations on map 501 to which the relative location of vehicle 304 corresponds can become smaller.

In addition to assigning parking line 512 end point 536-based probabilities to particles 506, vehicle 304 can assign GPS-based probabilities to particles 506. The GPS-based probabilities assigned by vehicle 304 to particles 506 can be cumulative of the parking line 512 end point 536-based probabilities assigned by vehicle 304 to particles 506. Specifically, vehicle 304 can determined its GPS location, and can assign particles 506 that fall within a circle 510 of a given radius or other shape of a given size (e.g., corresponding to the error expected from a location determined using a GPS receiver) centered at the determined GPS location a higher probability than particles 506 that fall outside of the circle 510. In some examples, every particle 506 inside the circle 510 can be assigned the same high probability, while the probabilities assigned outside of the circle 510 can gradually change from the high probability at the edge of the circle 510 to zero probability as the particles 506 are further and further from the circle 510. In some examples, the error expected from a GPS location determination can be higher than an error expected from the parking line 512 end point 536-based location determination, and therefore, the radius of circle 510 can be larger than the radius of circle 508. Further, in some examples, GPS-based location can be unique, whereas parking line 512 end point 536-based location may not be; as such, vehicle 304 may only assign probabilities to particles 506 based on circle 510 at one location in map 501.

After vehicle 304 has assigned the above probabilities to particles 506, some particles 506 will have been assigned probabilities based only on a GPS-based location determination (e.g., particles 506 within only circle 510), other particles 506 will have been assigned probabilities based on an end point 536-based location determination (e.g., particles within only circles 508), and some particles 506 will have been assigned probabilities based on both a GPS-based location determination and an end point 536-based location determination (e.g., particles within circles 508 and circle 510, which can, therefore, have the highest probabilities of particles 506 in map 501). At this point, vehicle 304 can perform a weighted resampling of particles 506 in map 501, such that vehicle 304 can pick particles 506 with higher probabilities as vehicle 304 location candidates more often than particles with lower probabilities. This resampling step can provide the final distribution for the position and orientation candidates for vehicle 304. In some examples, vehicle 304 can approximate this distribution as a Gaussian distribution. Vehicle 304 can identify the mean of the distribution as the location estimate of vehicle 304 at the current time-step (e.g., position and orientation), and can identify the standard deviation of the distribution as the error of this estimation.

As mentioned above, vehicle 304 can perform the above steps to estimate its location at each of a plurality of time-steps (e.g., continuously) such that its location estimate remains accurate and current. At each time step, vehicle 304 can perform the steps described above, except as otherwise modified below. Specifically, at consecutive time-steps (e.g., time-steps after the initial time-step), particles 506 can be initialized in map 501 in an area (e.g., of predefined size/shape, such as a circle) surrounding the location estimate determined at the previous time step. In some examples, these particles 506 can replace the particles 506 used in the previous time step, and in other examples, these particles 506 can be in addition to the particles 506 used in the previous time step. The size of this area, and the range of orientations represented by these newly-initialized particles 506, can be determined based on the amount of error expected in determining/predicting motion of vehicle 304, as will be described in more detail below. Once these newly-initialized particles 506 are placed in map 501, vehicle 304 can determine its location in the current time-step in the same manner as described above.

In some examples, in addition or alternatively to initializing particles 506 in consecutive time-steps as described above, vehicle 304 can split particles 506 into multiple particles around the original particles if vehicle 304 is moving (in some examples, vehicle 304 may not split particles 506 in consecutive time-steps if vehicle 304 is not moving, so as to reduce the likelihood that error in location estimation will increase rapidly when vehicle 304 is not moving). Such particle 506 splitting can help avoid overfitting the location estimate of vehicle 304 over time, and can allow for more accurate modeling of the resulting location distribution described previously. For example, referring to FIG. 5C, in consecutive time-steps if vehicle 304 is moving, vehicle 304 can propagate particles 506 from the previous time-step by a distance traveled by vehicle 304 since the previous time-step. Vehicle 304 can determine this distance based on a motion model, which can estimate incremental motion of vehicle 304 using dead-reckoning (e.g., by subtracting measurements obtained at consecutive time-steps from vehicle motion sensors such as wheel-encoders and yaw-rate sensors). The error expected in this propagation distance can be expressed in how vehicle 304 splits particles 506 based on the determined motion of vehicle 304. For example, vehicle 304 can split particle 506A into particles 506B and 506C. Particle 506B can represent particle 506A having been propagated by a maximum distance traveled by vehicle 304 since the last time-step, and particle 506C can represent particle 506B having been propagated by a minimum distance traveled by vehicle 304 since the last time-step. The difference in propagation distance between particles 506B and 506C can correspond to the error expected in the travel distance determination provided by the motion model of vehicle 304. Particles 506B and 506C can similarly track and account for errors in orientation tracking provided by the motion model of vehicle 304. Other particles 506 can similarly be split and propagated in map 501 based on the determined motion of vehicle 304, as described above. Once particles 506 have been split and propagated, vehicle 304 can determine its location in the current time-step in the same manner as described above.

Figure 5D:
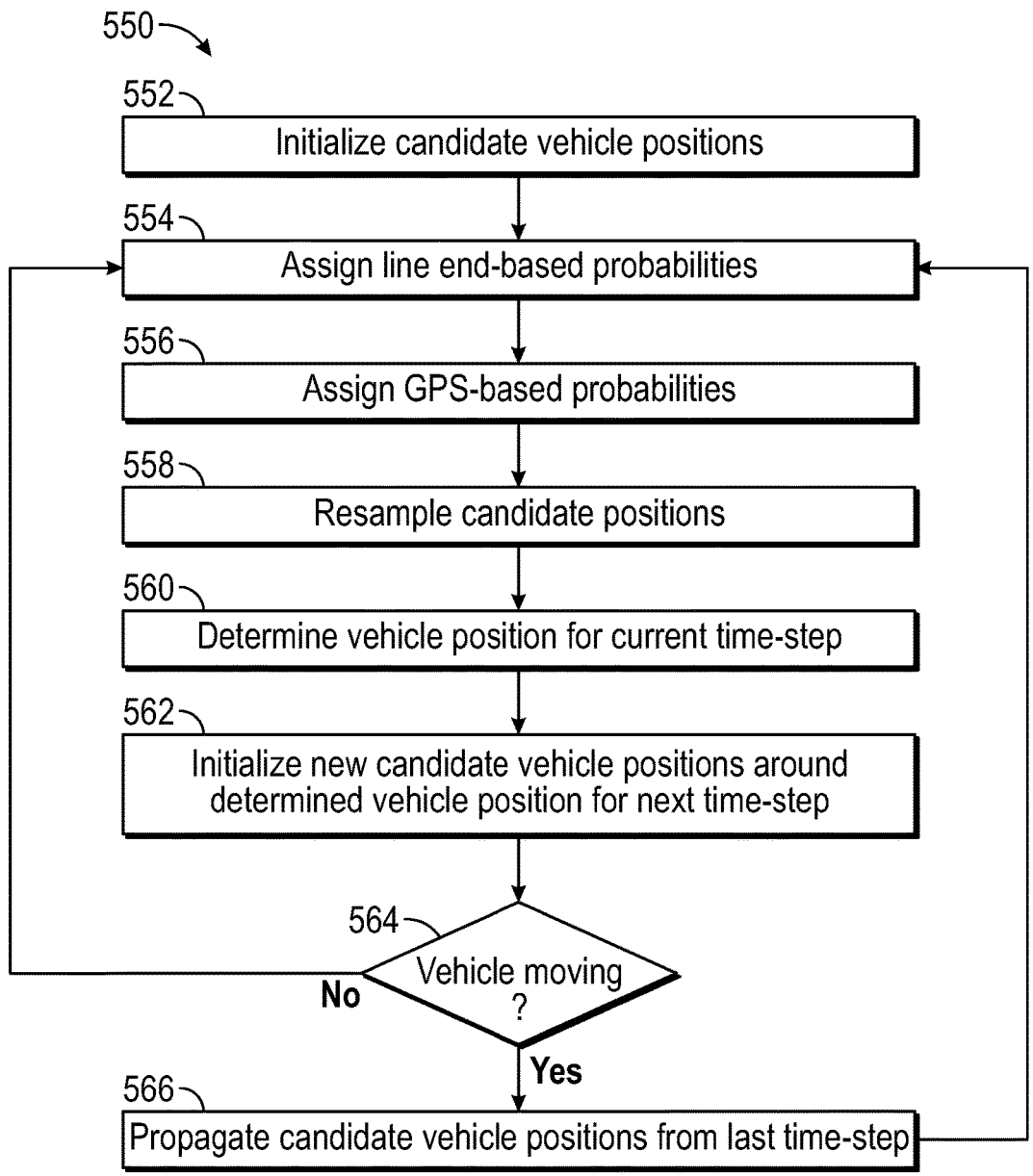

FIG. 5D illustrates an exemplary method 550 of localizing vehicle 304 in parking lot 302 using parking line 512 end points 536 and GPS measurements according to examples of the disclosure. Method 550 can correspond to the examples described with reference to FIGS. 5A-5C. At 552, vehicle 304 can initialize particles 506 in map 501 as candidate vehicle locations for a current time-step of method 550 (e.g., as described with reference to FIG. 5B). At 554, vehicle 304 can assign parking line 512 end point 536-based location probabilities to particles 506 in map 501 (e.g., as described with reference to FIG. 5B). At 556, vehicle 304 can assign GPS-based location probabilities to particles 506 in map 501 (e.g., as described with reference to FIG. 5B). At 558, vehicle 304 can resample candidate vehicle location particles 506 in map 501 to create a distribution of candidate vehicle locations (e.g., as described with reference to FIG. 5B). At 560, vehicle 304 can determine its location at the current time-step of method 550 based on the distribution of candidate vehicle locations (e.g., as described with reference to FIG. 5B). At 562, vehicle 304 can initialize new particles 506 for a next time-step of method 550 (e.g., as described with reference to FIGS. 5B-5C). At 564, if vehicle 304 has not moved since the last time-step of method 550, method 550 can return to step 554. At 564, if vehicle 304 has moved since the last time-step of method 550, vehicle 304 can propagate particles 506 from the last time-step of method 550 in accordance with the motion of vehicle 304 since the last time-step (e.g., as described with reference to FIG. 5C). In this way, vehicle 304 can accurately and continuously localize itself within parking lot 302 using one or more onboard cameras and a GPS receiver.

After localizing itself within parking lot 302 (e.g., as described with reference to FIGS. 5A-5D), vehicle 304 can identify empty parking spaces in parking lot 302, as will be described with reference to FIGS. 6A-6G. Specifically, as will be described below, vehicle 304 can represent parking lot 304 by a spatial grid of cells (e.g., a two-dimensional occupancy grid including rows and columns of occupancy cells that each correspond to a two-dimensional area of parking lot 302), and can assign occupancy values to these cells based on data from various onboard range sensors on vehicle 304 (e.g., LiDAR, ultrasonic, radar, etc.). Vehicle 304 can then correspond those cells with parking spaces in parking lot 302 to determine whether a given parking space is empty or occupied.

Figure 6A:
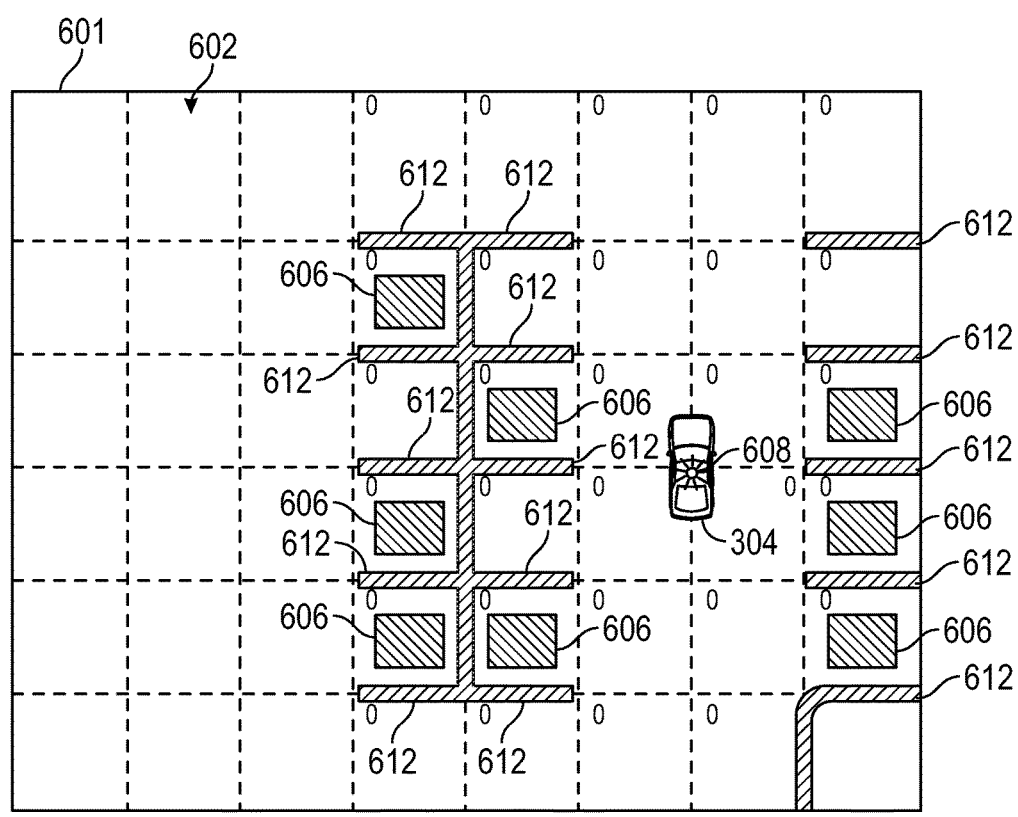
FIGS. 6A-6G illustrate exemplary details for determining the occupancy states of parking spaces in a parking lot according to examples of the disclosure.

FIGS. 6A-6G illustrate exemplary details for determining the occupancy states of parking spaces in parking lot 302 according to examples of the disclosure. FIGS. 6A-6G can correspond to step 218 in FIG. 2B, and the vehicle of the disclosure can continuously perform step 218 (as part of method 210) as it moves through the parking lot to identify an empty parking space. FIG. 6A illustrates an exemplary occupancy grid 601 with which vehicle 304 can represent the occupancy of parking lot 302. Occupancy grid 601 can include rows and columns of cells 602. In some examples, fewer or more cells 602 can be used by vehicle 304 to represent the occupancy of parking lot 302. Vehicle 304 can be located inside parking lot 302, as illustrated in FIG. 6A. Further, some parking spaces formed by parking lines 612 can be occupied by other vehicles 606, while other parking spaces formed by parking lines 612 can be unoccupied. Vehicle 304 can include one or more range sensors 608 (e.g., LiDAR, radar, ultrasonic, etc.). In the example of FIG. 6A, the size of a cell 602 can be substantially the same as the size of a parking space; however, it is understood that the examples described here can be applied in analogous manners to occupancy grids 601 in which the size of a cell 602 can be larger or smaller than the size of a parking space.

At a first time-step of determining the occupancy states of parking spaces in parking lot 302, vehicle 304 can initialize each cell 602 in occupancy grid 601 with a zero value (or a value corresponding to a zero or unknown occupancy state value), as illustrated in FIG. 6A. For the purposes of this disclosure, cells 602 in FIGS. 6A-6F that do not include an indication of a numeric value can be assumed to have zero values.

Figure 6B:
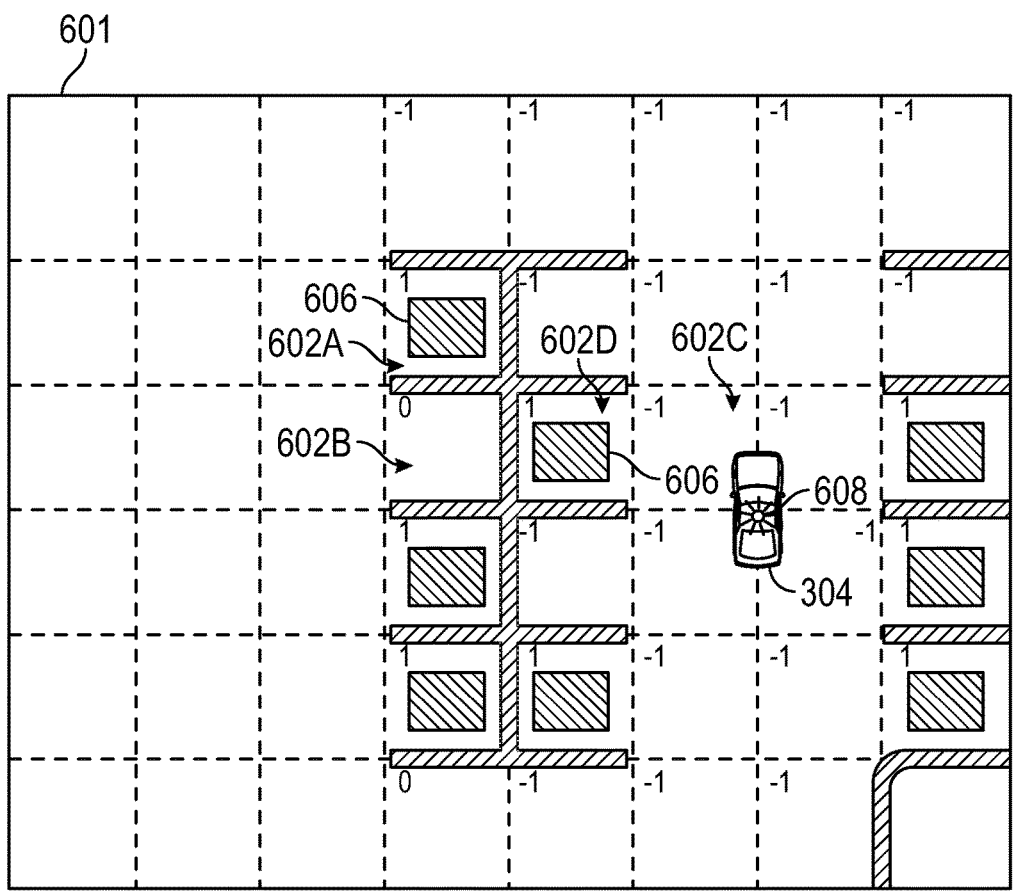

Object detections from range sensor(s) 608 can be used by vehicle 304 to update the values of one or more cells 602, as illustrated in FIG. 6B. For example, cells 602 in which range sensor(s) detect an object can have their existing values incremented by +1 (or another value that can be used to indicate that the cells 602 are occupied in a manner similar to that described here). Cells 602 that fall along a line (e.g., corresponding to a line travelled by a LiDAR beam) from range sensor(s) 608 to the cells 602 in which objects are detected can have their existing values incremented by −1 (i.e., decremented by +1 or another value that can be used to indicate that the cells 602 are occupied in a manner similar to that described here), because cells 602 between the cell 602 in which range sensor(s) 608 detected an object and range sensor(s) can be assumed to be empty. More generally, cells 602 in which range sensor(s) detect no objects can also have their existing values decremented by +1. For example, referring to FIG. 6B, range sensor(s) 608 can detect vehicle 606 in cell 602A. Therefore, the value of cell 602A can be incremented by +1. The values of cells 602 between cell 602A and range sensor(s) 608 can be decremented by +1, such as cell 602C. The value of cell 602B can remain as it was before (e.g., not incremented or decremented), because cell 602B can be out of sight of range sensor(s) 608 (e.g., blocked by vehicle 606 in cell 602D). Other cells 602 in occupancy grid 601 can similarly have their values updated according to detections by range sensor(s) 608, as described above.

Figure 6C:
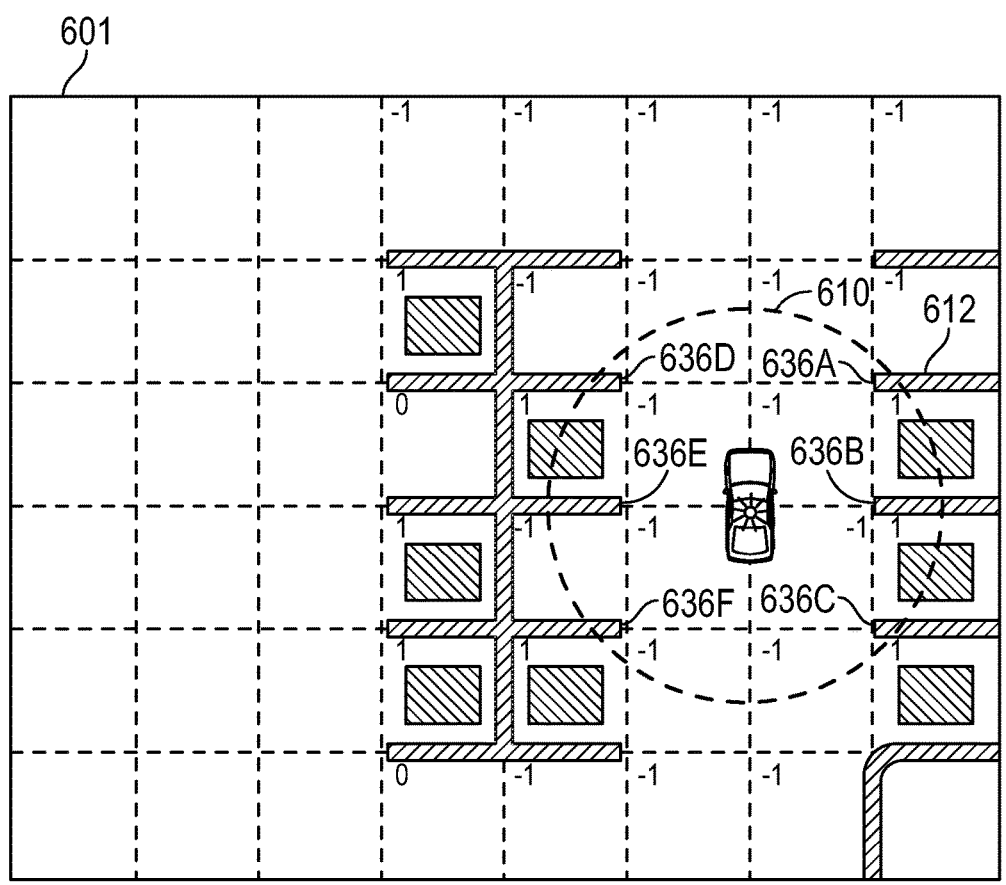
Figure 6D:
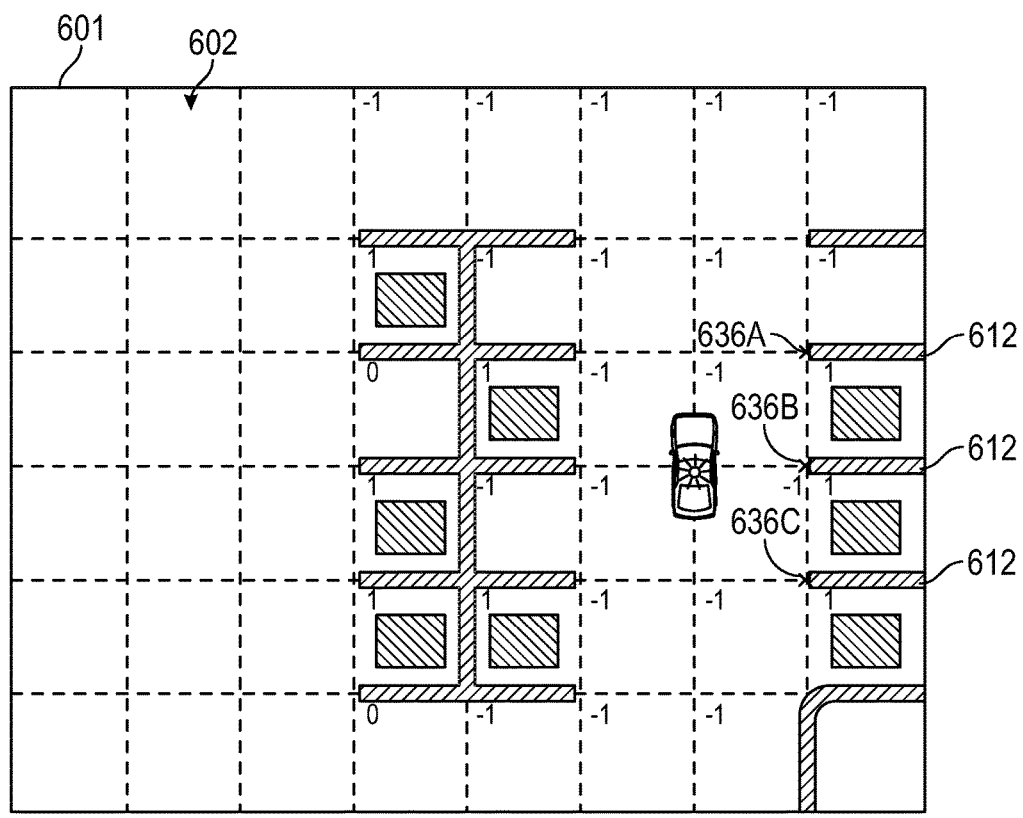

After updating the values of cells 602 as described above, vehicle 304 can detect candidate parking spaces in which vehicle 304 can park. To do so, in some examples, vehicle 304 can search for parking line 612 ends 636 that are within a circle 610 (or other area) with a specified radius (e.g., six feet, eight feet, ten feet, etc.) of a reference point on vehicle 304 (e.g., its rear axle), as shown in FIG. 6C. Vehicle 304 can determine these parking line 612 ends 636 from previously determined parking line 612 ends 636 on the map of the parking lot (e.g., as determined in FIGS. 4A-4F). For example, as shown in FIG. 6C, vehicle 304 can identify three parking line 612 ends 636 to its right and three parking line 612 ends 636 to its left that are within circle 610. From this collection of parking line 612 ends 636, vehicle 304 can select pairs of parking line 612 ends 636 that are substantially a threshold distance apart (e.g., 2.75 meters apart, +/−a distance range, such as in a standard parking space or as reflected in the map of the parking lot) to construct a list of parking line 612 end 636 pairs. Next, using its determined position and orientation (e.g., as determined in FIGS. 5A-5D), vehicle 304 can discard parking line 612 end 636 pairs that appear on one side of vehicle 304 (e.g., the left side of vehicle 304), and can keep parking line 612 end 636 pairs that appear on the other side of vehicle 304 (e.g., the right side of vehicle 304). Vehicle 304 may only maintain parking line 612 end 636 pairs that are on one side of vehicle 304, because in some vehicle jurisdictions, traffic etiquette and/or laws may dictate parking should occur on one side of vehicle 304 or another. For example, vehicle 304 may only maintain parking line 612 end pairs on its right side, and therefore, in FIG. 6C, two pairs of parking line 612 ends 636 can remain: pair 636A-636B, and pair 636B-636C, as shown in FIG. 6D. Using these two pairs of parking line 612 end 636 pairs, vehicle 304 can construct rectangular parking spaces for each pair by extending lines away from vehicle 304 from each parking line 612 end 636 in the above pairs. In some examples, vehicle 306 may not need to construct parking spaces on its own, because the map of the parking lot used by vehicle 304 may already include such information.

Once vehicle 304 has constructed (or otherwise identified) candidate parking spaces, as described above, vehicle 304 can evaluate the occupancy of those parking spaces based on cells 602 in occupancy grid 601. Specifically, vehicle 304 can analyze the values of one or more cells 602 in occupancy grid 601 that cover or are within the area of the candidate parking spaces identified above. Vehicle 304 can utilize two thresholds in evaluating the occupancy of the candidate parking spaces. In some examples, the two thresholds utilized can be in the form of +/−(time constant)$^m$, where "time constant" can be a time constant by which the values of cells 602 can be multiplied each time step (e.g., to "forget" the occupancy states of cells 602 over time), and m can correspond to the number of time steps required to forget the states (e.g., occupied/empty) of cells 602. Other thresholds can similarly be used. Cell 602 values above +(time constant)$^m$ can indicate an occupied cell 602, cell 602 values below −(time constant)$^m$ can indicate an empty cell 602, and cell 602 values in between +(time constant)$^m$ and −(time constant)$^m$ can indicate an unknown state for a cell 602. In the examples of FIGS. 6A-6F, "time constant" can be 0.3 and "m" can be 2, though it is understood that other "time constants" and values for "m" can similarly be utilized. When determining the occupancy of a given candidate parking space, if any cell 602 within the candidate parking space has a value that is greater than the positive occupancy threshold (e.g., +(time constant)$^m$), vehicle 304 can determine that detection of an object within that cell 602 inside the candidate parking space has been observed in the last "m" time steps, and therefore, vehicle 304 can determine that the candidate parking space is occupied. If all of the cells 602 within the candidate parking space have values that are less than the negative occupancy threshold (e.g., −(time constant)$^m$), vehicle 304 can determine that no detection of an object within the parking space has been observed within the last "m" time steps, and therefore, vehicle 304 can determine that the candidate parking space is empty. Otherwise, vehicle 304 can determine that the occupancy of the candidate parking space is unknown or unseen.

For example, referring again to FIG. 6D, the values of all of the cells 602 corresponding to the two candidate parking spots identified on the right of vehicle 304 can be +1, which can be greater than +0.3$^2$ (0.09). Therefore, vehicle 304 can determine that both of the candidate parking spaces are occupied.

Figure 6E:
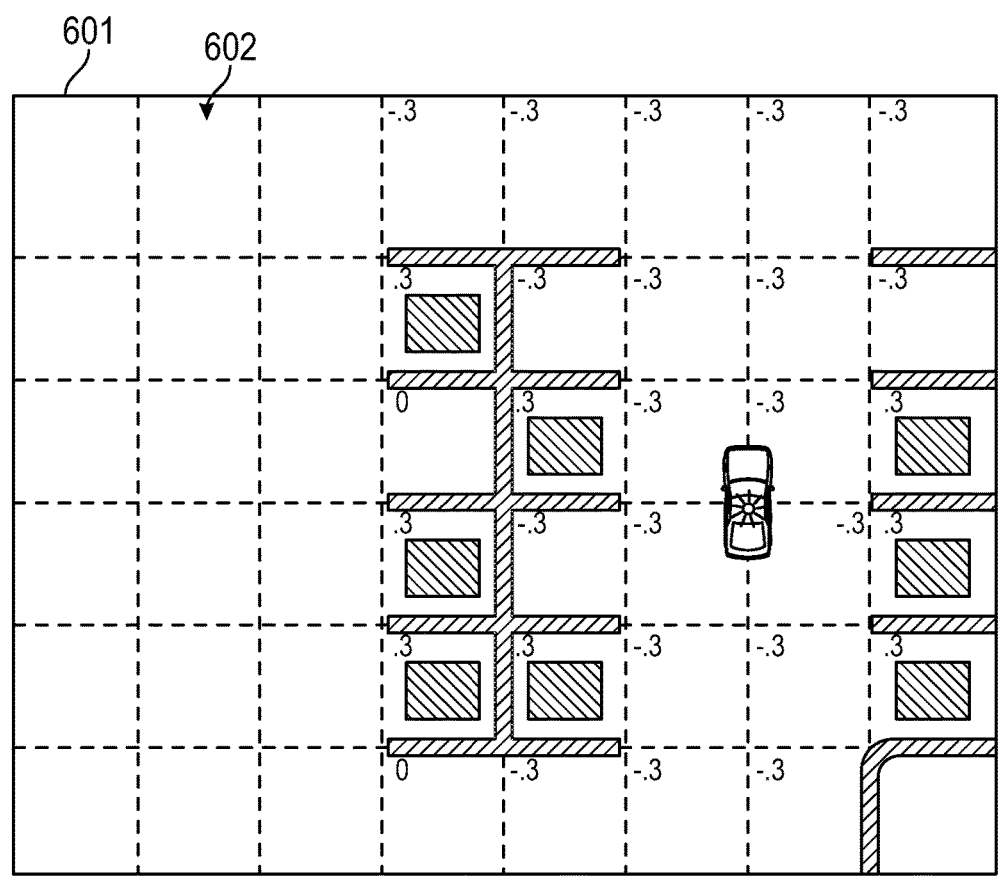

As previously described, in order to "forget" the occupancy states of cells 602 in occupancy grid 601 (and thus the occupancy states of parking spaces corresponding to those cells 602), vehicle 304 can multiply the value of every cell 602 in occupancy grid 601 by "time constant" (e.g., 0.3) at the end of every time step. For example, FIG. 6E illustrates exemplary cell 602 values after vehicle 304 multiplies the cell 602 values in FIG. 6D by a time constant of 0.3. After multiplying the values of cells 602 by "time constant," vehicle 304 can repeat the steps described above to determine the occupancy states of cells 602/parking spaces for the current time step.

Figure 6F:
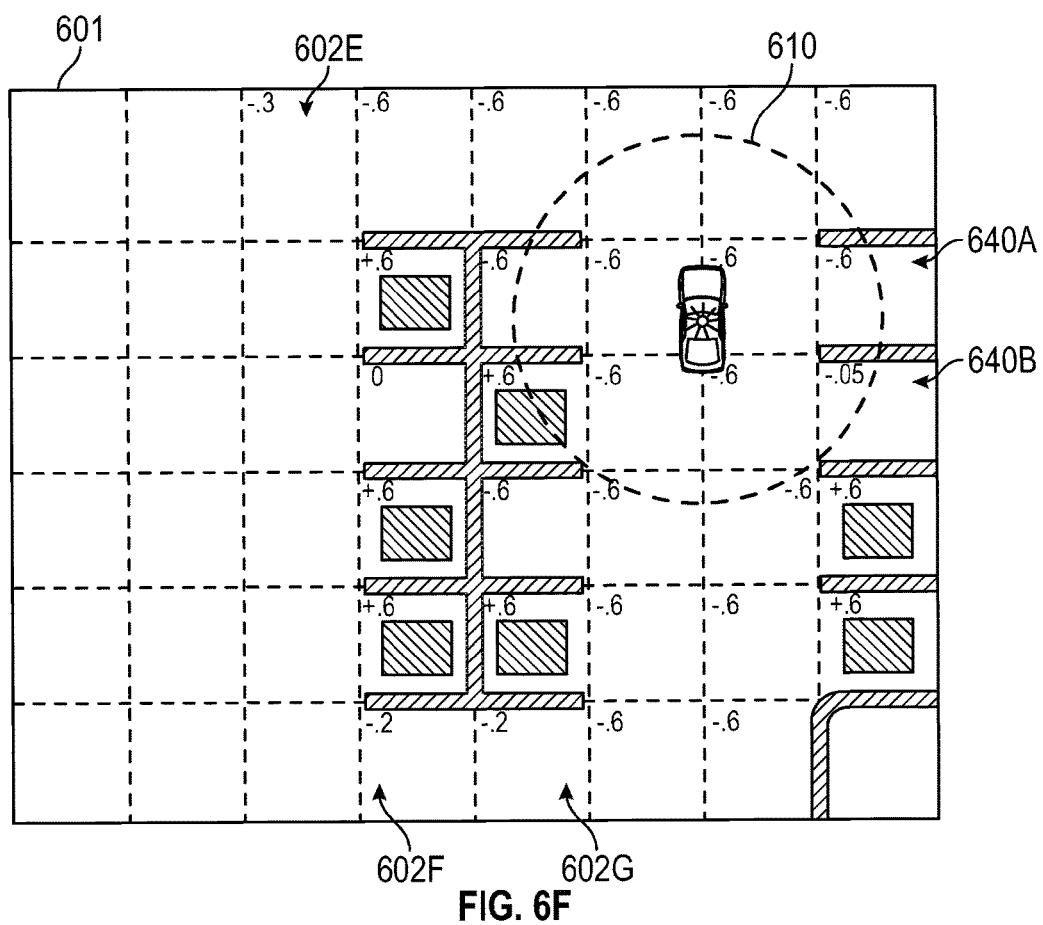

FIG. 6F illustrates vehicle 304 having moved over multiple time steps such that vehicle 304 has identified two candidate parking spaces 640A and 640B to its right, in the manner described above. As a result of having moved, vehicle 304 can now detect occupancy in some cells 602 that it could not previously detect (e.g., cell 602E), and therefore vehicle 304 has started updating the value(s) of those cells. Further, vehicle 304 can now no longer detect occupancy in some cells 602 that is could previously detect (e.g., cells 602F and 602G), and therefore vehicle 304 has stopped updating the value(s) of those cells. Vehicle 304 has continued to update the values of cells 602 each time step, in the manner described above. Finally, parking space 640B, which was previously occupied by a vehicle 606, is no longer occupied by a vehicle 606.

Vehicle 304 can determine the occupancy states of parking spaces 640A and 640B in the manners previously described. Specifically, "time constant" can be 0.3, and m can be 2. Therefore, the positive occupancy threshold can be +0.09 and the negative occupancy threshold can be −0.09. Cell 602 corresponding to parking space 640A can have a value of −0.6, which can be less than the negative threshold. Therefore, vehicle 304 can determine that parking space 640A is empty. On the other hand, cell 602 corresponding to parking space 640B can have a value of −0.05 (e.g., parking space 640B can have been recently vacated by a vehicle 606). Therefore, vehicle 304 can determine that the occupancy state of parking space 640B is unknown, because −0.05 can be in between −0.09 and +0.09. Therefore, in the example of FIG. 6F, vehicle 304 can identify parking space 640A as an empty candidate parking space, and can proceed to autonomously park in parking space 640A, as described with reference to step 226 in method 210 in FIG. 2B.

Figure 6G:
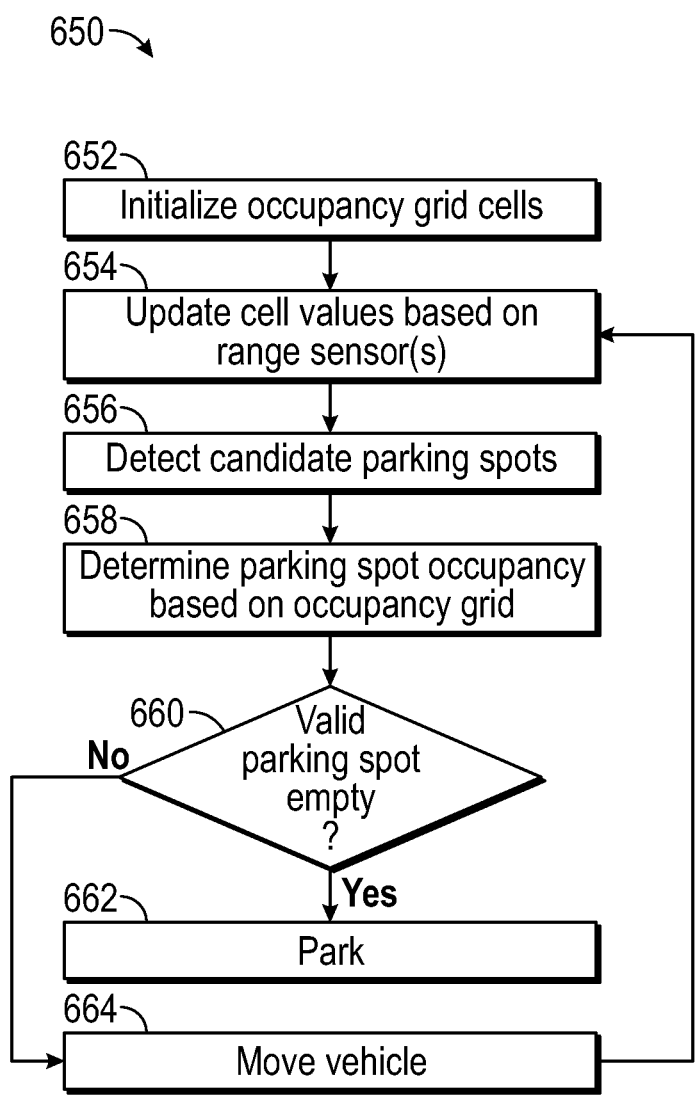

FIG. 6G illustrates an exemplary method 650 of identifying an empty candidate parking space for autonomous parking according to examples of the disclosure. Method 650 can correspond to the examples described with reference to FIGS. 6A-6F. At 652, vehicle 304 can create an occupancy grid and initialize cell values to initial values (e.g., as described with reference to FIG. 6A). At 654, vehicle 304 can update the cell values based on range sensor(s) detections (e.g., as described with reference to FIG. 6B). At 656, vehicle 304 can identify candidate parking spaces in the parking lot (e.g., as described with reference to FIGS. 6C-6D). At 658, vehicle 304 can determine the occupancy states of the candidate parking spaces (e.g., as described with reference to FIG. 6D). At 660, if vehicle 304 has determined that a valid candidate parking space is empty, vehicle 304 can park in that empty parking space at 662 (e.g., as described with reference to step 226 in method 210 in FIG. 2B). However, if vehicle 304 has determined that no valid parking space is empty, vehicle 304 can autonomously move at 664 (e.g., through the parking lot towards additional parking spaces), and method 650 can return to step 654 (e.g., as described with reference to FIG. 6F). Throughout method 650, vehicle 304 can multiply the values of cells within the occupancy grid with a time constant at each time step to make vehicle 304 forget the occupancy of cells within the grid over time (e.g., as described with reference to FIGS. 6E-6F). In this way, vehicle 304 can autonomously identify and select an empty parking space in the parking lot in which to park.

Figure 7A:
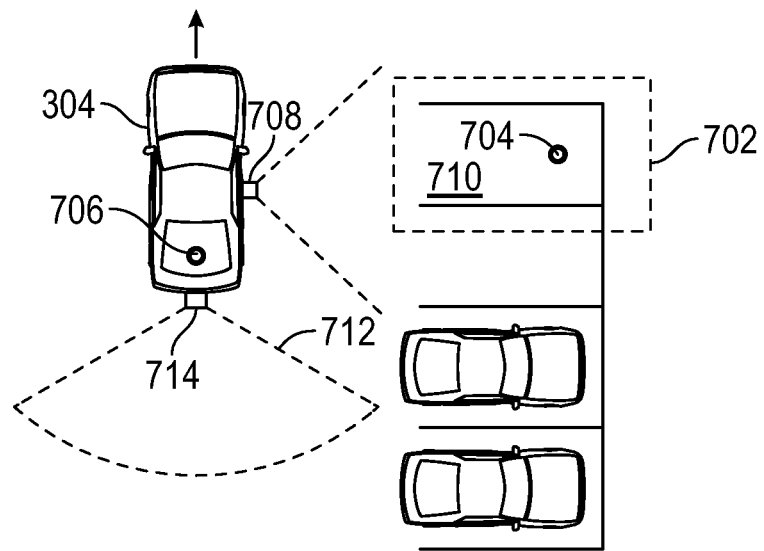
FIGS. 7A-7D illustrate exemplary details for calculating a region of interest corresponding to the selected parking space according to some examples of the disclosure.

FIGS. 7A-7D illustrate exemplary details for calculating a region of interest corresponding to the selected parking space according to some examples of the disclosure. FIGS. 7A-7D can correspond to step 220 in FIG. 2B, and the vehicle of the disclosure can continuously perform step 220 (as part of method 210) as it autonomously parks in the parking lot 302. FIG. 7A illustrates the vehicle 304 determining the region of interest 702 containing the selected parking space 710. In some examples, an estimate of the region of interest 702 can be obtained from map data, one or more previously captured images, and/or other data relied on to locate the vehicle 304 as described above with reference to FIGS. 5A-5D. Selected parking space 710 can include final parking position 704, which can correspond to the desired location of the rear axle 706 of vehicle 304 once it is finished parking, for example. In some examples, selected parking space 710 can be initially detected by a range sensor 708 of vehicle 304 (e.g., after determining the occupancy of the selected parking space 710 as described with reference to FIGS. 6A-6G). The accuracy of the region of interest 702 based on the range sensor 708, GPS, and other data can be lower than desired for autonomous parking (e.g., within half a meter or some other margin of error). Accordingly, it can be desirable for vehicle 304 to move such that the region of interest 702 is within the field of view 712 of a selected camera 714, for example. In some examples, the selected camera 714 can be a rear camera to assist in a rear-in parking operation. In some examples, the selected camera can be a front camera to assist in a front-in parking operation. Other selected cameras are possible. Capturing the region of interest 702 with the selected camera 712 can allow the vehicle 304 to determine its position relative to the region of interest with improved accuracy (e.g., within ten centimeters or some other margin of error).

Figure 7B:
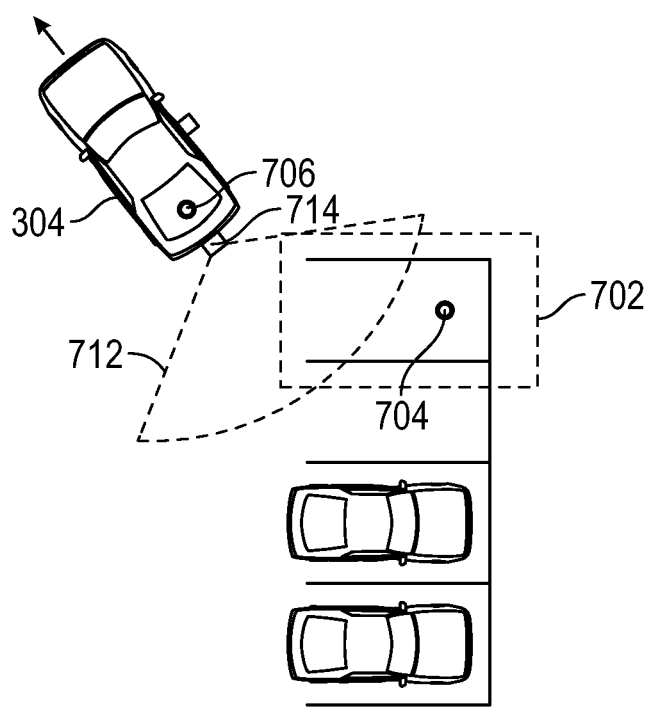

FIG. 7B illustrates the vehicle 304 capturing part of the region of interest 702 with its selected camera 714 according to examples of the disclosure. As shown in FIG. 7B, vehicle 304 has moved so that part of the region of interest 702 is within the field of view 712 of the selected camera 714. Although only part of the region of interest 702 can be included in the field of view 712, the vehicle 304 can have an estimate of the entire region of interest based on previously-obtained data, for example. Further, in some examples, the vehicle can estimate the position of its rear axle 706 relative to the final parking position 704 based on the image captured by selected camera 714 and the estimate of the entire region of interest 702. As the vehicle 304 continues to move, it can obtain a more precise estimate of the region of interest 702 based on one or more further images captured by camera 714.

Figure 7C:
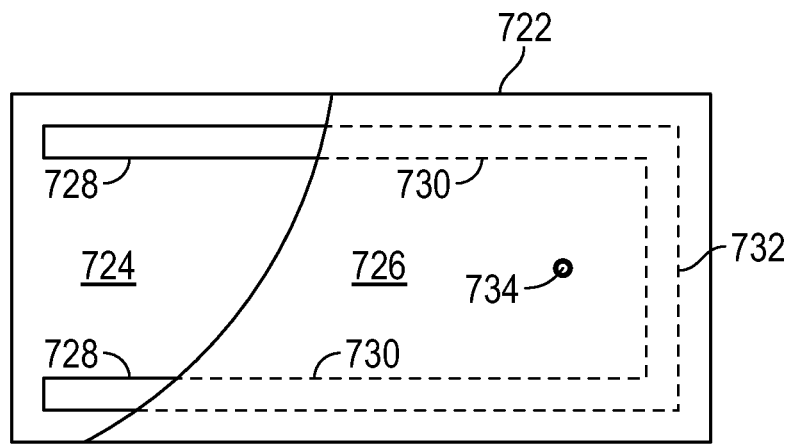

FIG. 7C illustrates an exemplary region of interest image 722 that can correspond to a region of interest image obtained by vehicle 304 in the position illustrated in FIG. 7B. In some examples, the region of interest image 722 can be composed of a camera image 724 captured by selected camera 714 and an estimated image 726 determined from GPS sensor data, range sensor data, map data, and/or other sources. The camera image 724 can include horizontal line images 728 depicting portions of the horizontal lines of selected parking space 710. The horizontal line images 728 can be identified in the camera image 724 according to the methods described below with reference to FIGS. 8A-8B, which can be the same or similar to the methods described above with respect to FIGS. 3A-E. The estimated image 726 can include estimated horizontal line images 728, estimated vertical line image 732, and an estimate of the final parking position 734, for example. In some examples, one or more of the estimated horizontal line images 728, estimated vertical line image 732, and the estimate of the final parking position 734 can be based on one or more of the camera image 724, GPS sensor data, range sensor data, map data, and/or other sources. As the vehicle moves, the region of interest image 722 can become more precise as the camera image 724 can become larger, thereby occupying a larger portion of the region of interest image and providing more data with which to generate the estimated image 726.

Figure 7D:
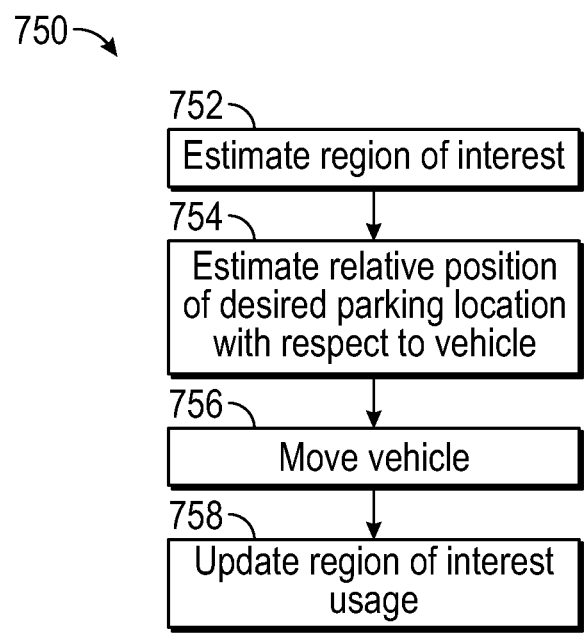

FIG. 7D illustrates an exemplary method 750 of calculating a region of interest 702 containing a selected parking space 710 according to examples of the disclosure. Method 750 can correspond to the examples described with reference to FIGS. 7A-7C. At 752, vehicle 304 can estimate a region of interest 702 (e.g., as described with reference to FIG. 7A). At 754, vehicle 304 can estimate its position relative to a desired final parking position within the region of interest 702 (e.g., as described with reference to FIG. 7A). At 756, the vehicle 304 can move such that part of the region of interest 702 is captured by a selected camera 714 of the vehicle (e.g., as described with reference to FIG. 7B). At 758, the vehicle 304 can update the region of interest image 722 (e.g., as described with reference to FIG. 7C).

As vehicle 304 continues to update its region of interest image 722, it can refine its determined position relative to the region of interest 702 with increased precision. Specifically, gathering one or more camera images 724 including the region of interest 702 can be used to better determine the position of the vehicle relative to the region of interest 702. However, the vehicle 304 may need to identify one or more parking lines of the selected parking space 710 within the region of interest image 722 to estimate its position, including distance and angular offset, relative to the region of interest 702 with enough specificity to autonomously park. Therefore, as will be described below, the vehicle 304 can identify the parking lines within the region of interest image 722 generated in FIGS. 7A-7C.

Figure 8A:
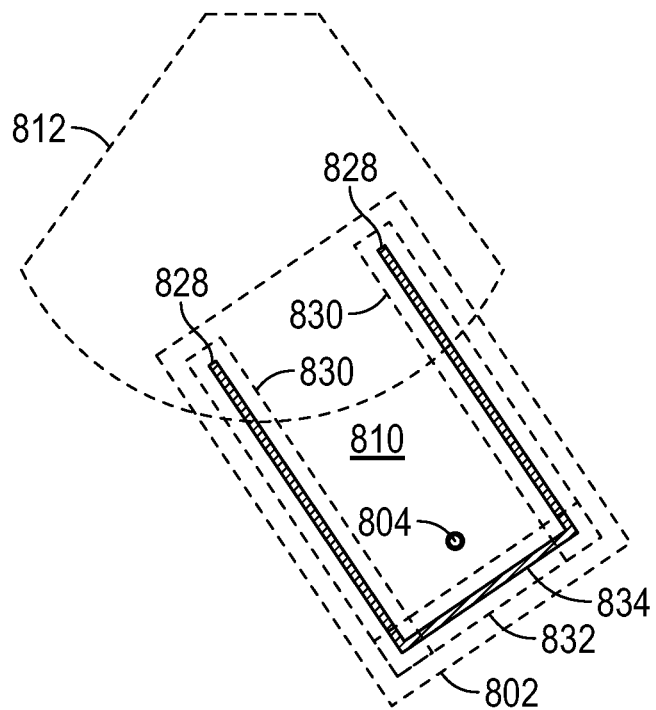
FIGS. 8A-8B illustrate exemplary details for detecting the lines of the selected parking space within a selected field of view according to examples of the disclosure.
Figure 8B:
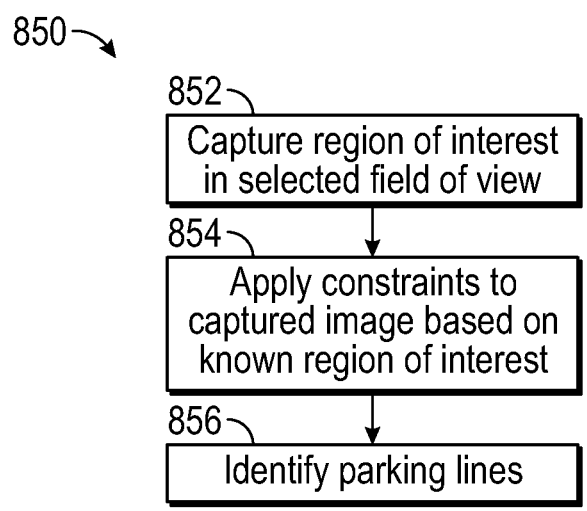

FIGS. 8A-8B illustrate exemplary details for detecting the lines 828 and 834 of the selected parking space 810 within a selected field of view 812 according to examples of the disclosure. In some examples, the selected field of view 812 can correspond to field of view 712 of selected camera 714 described with reference to FIGS. 7A-7D. As described above, a portion of horizontal lines 828 of selected parking space 810 can be captured in the selected field of view 812, for example. In some examples, vehicle 304 can generate estimated horizontal lines 830 and estimated vertical lines 832 based on a region of interest image (e.g., region of interest image 722). Additionally, the vehicle can estimate a final parking position 804 based on the region of interest image 722, for example.

In some examples, the vehicle can detect horizontal parking lines 828 within selected field of view 812 by performing operations similar to method 350 described above with reference to FIGS. 3A-3E. However, the vehicle 304 can apply one or more constraints to method 350 based on estimated horizontal parking lines 830 to improve the efficiency and accuracy of method 350. For example, one or more steps of method 350 may only be performed on pixels within a threshold distance of estimated horizontal parking lines 830 within the region of interest image 722. Vehicle 304 may only determine pixel gradients in step 352 for pixels within a threshold distance of estimated horizontal parking lines 830. Vehicle 304 may only create a Hough transform table in step 354 for the pixels within a threshold distance of estimated horizontal parking lines 830. Vehicle 304 may apply heavier weights to lines within a threshold distance of estimated parking lines 830 as it performs Hough voting in step 356. Vehicle 304 may restrict the subset of lines determined by Hough voting in step 358 to lines within a threshold distance of estimated parking lines 830. Other constraints to method 350 are possible to leverage the estimated parking lines 830 to improve accuracy in localizing the parking lines 828 and/or increase the speed of localizing the parking lines 828, for example. Once vehicle 304 applies one or more constraints to method 350, it can identify the parking lines 828. In some examples, identifying the parking lines 828 can include identifying the parking line ends in a method similar to method 450 described with reference to FIGS. 4A-4F.

FIG. 8B illustrates an exemplary method 850 of detecting parking lines 828 in a selected field of view 812 according to examples of the disclosure. Method 850 can correspond to the examples described with reference to FIG. 8A. At 852, the vehicle 304 can capture part of a region of interest 802 in a selected field of view 812. At 854, vehicle 304 can apply constraints to the captured image based on a known or estimated region of interest. At step 856, vehicle 304 can identify one or more parking lines 828 using one or more of methods 350 and 450 with the constraints applied. Although the example described with reference to FIG. 8A illustrates locating the horizontal parking lines 828, in some examples, vehicle 304 can additionally or alternatively capture an image of the vertical parking line 834 and detect the vertical parking line within the region of interest 802.

As the vehicle 304 detects one or more parking lines 828 and/or 834 in the region of interest 802, it can refine the region of interest image 722 with increased precision. Next, the vehicle 304 can determine its relative position to a final parking position 804 by calculating one or more errors in the position of the vehicle's rear axle (e.g., rear axle 706) relative to the final parking position 804.

Figure 9A:
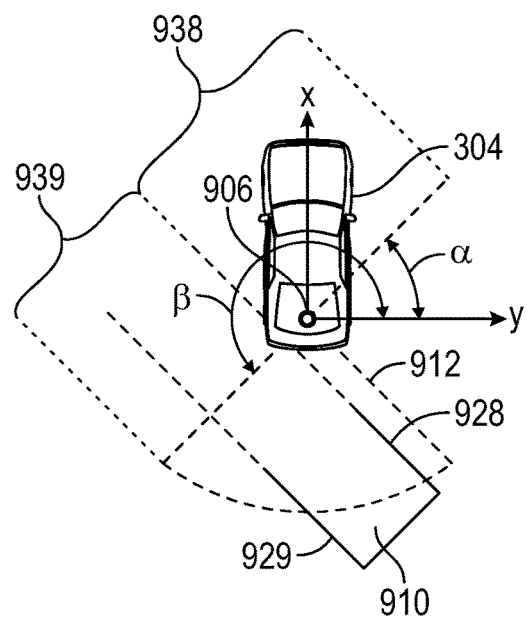
FIGS. 9A-9E illustrate exemplary details for calculating one or more errors in the position of vehicle according to examples of the disclosure.

FIGS. 9A-9E illustrate exemplary details for calculating one or more errors in the position of vehicle 304 according to examples of the disclosure. FIG. 9A illustrates an exemplary angular displacement of vehicle 304 relative to horizontal parking lines (e.g., right line 928 and left line 929) according to examples of the disclosure. Right line 928 and left line 929 can be captured within selected field of view 912 and identified according to methods 750 and 850 described above. Vehicle 304 can determine one or more of its right angular displacement $\alpha$ from the right line 928 and its left angular displacement $\beta$ from the left line 929 as part of determining its relative location to selected parking spot 910. In some examples, a vehicle coordinate system (x, y) can be defined with its origin at the vehicle rear axle 906. Based on one or more captured images (e.g., captured by the selected camera 714), the vehicle 304 can determine a right normal 938 of the right line 928 and a left normal 939 of the left line 929, for example. Next, vehicle 304 can determine one or more of the right angular displacement $\alpha$ as the angle between the right normal 938 and the y-axis and the left angular displacement $\beta$ as the angle between the left normal 939 and the y-axis. In some examples, the right line 928 and the left line 929 can be substantially parallel and $\alpha$ and $\beta$ can be 180 degrees different from one another. In other examples, however, right line 928 and left line 929 may not be parallel and the difference between $\alpha$ and $\beta$ can be a different number of degrees. Once the vehicle 304 determines its angular displacement from the horizontal lines 928 and 929, it can convert the region of interest image to the vehicle coordinate system for further processing.

Figure 9B:
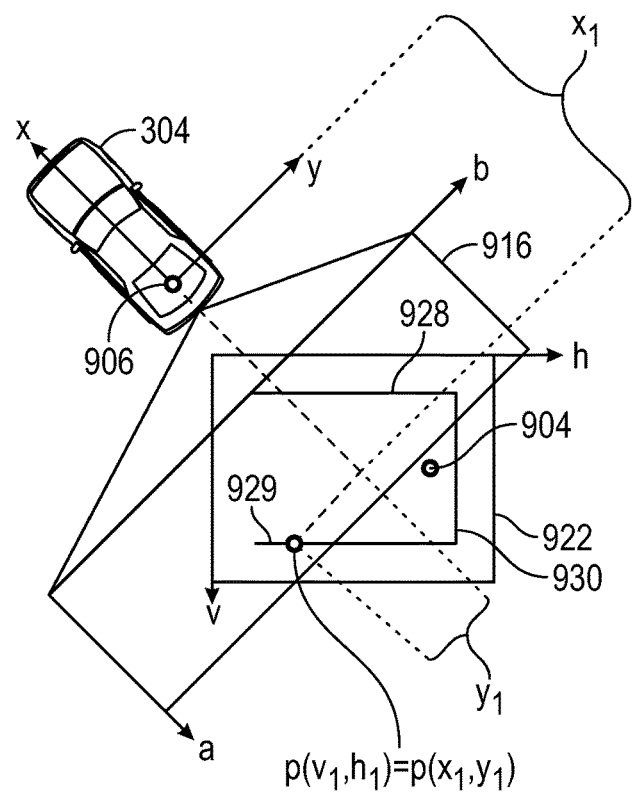

FIG. 9B illustrates an exemplary vehicle 304 converting a region of interest image 922 to a vehicle coordinate system according to examples of the disclosure. In some examples, the region of interest image 922 can have its own coordinate system (v, h) along its vertical and horizontal axes (e.g., aligned with one or more of horizontal lines 928-929 and vertical line 90). As vehicle 304 updates the region of interest image 922 and estimates its position relative to a final parking position 904, it can be advantageous to convert the pixels of the region of interest image 922 from the region of interest coordinate system (v, h) to the vehicle coordinate system (x, y). For example, point p can have a location (v1, h1) in the region of interest coordinate system and a location (x1, y1) in the vehicle coordinate system. The vehicle coordinate system can have a rotational difference from the region of interest coordinate system defined by $\alpha$ and/or $\beta$ and a translational difference from the region of interest coordinate system defined by a distance between the final parking position 904 and the vehicle rear axle 906. In some examples, a top image 916 of the region of interest captured by one or more cameras (e.g., selected camera 714 or one or more other cameras of camera(s) 106) of vehicle 304 can be used to convert the region of interest coordinate system (v, h) to the vehicle coordinate system (x, y). For example, the angles $\alpha$ and $\beta$ can be calculated from the top image 916 as described with reference to FIG. 9A. Additionally, the size of the region of interest can be determined in meters from the top image 916, for example. In some examples, vehicle 304 can assume the height of the selected camera is known and that the ground is relatively flat. Based on these assumptions, for example, the vehicle 304 can convert the pixel of top image 916 to dimensions in meters of the region of interest. In some examples, the top image 916 can have coordinate system (a, b) which can be parallel to vehicle coordinate system (x, y). Once the angular and translational displacement between the vehicle coordinate system (x, y) and the region of interest coordinate system (v, h) are identified, the vehicle can determine its positional errors relative to the final parking position 904.

Figure 9C:
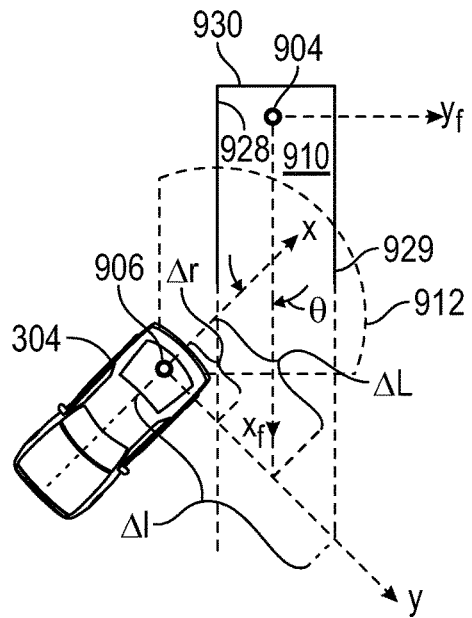

FIG. 9C illustrates exemplary lateral ($\Delta L$) and heading ($\theta$) errors according to examples of the disclosure. In some examples, vehicle 304 can determine its longitudinal, lateral, and heading errors relative to the final parking position 904. The vehicle 304 can determine the distance $\Delta r$ between the vehicle rear axle 906 and the right parking line 928 along the y-axis and the distance $\Delta l$ between the vehicle rear axle 906 and the left parking line 929 along the y-axis. The average of $\Delta r$ and $\Delta l$ can be the distance between the vehicle rear axle 906 and the final parking position 904 along the y-axis or the lateral error $\Delta L$. The heading error $\theta$ can be the angle between the x-axis and the final orientation of the x-axis, xf. In some examples, one or more of α and β can be used to calculate θ. As shown in FIG. 9C, in some examples, the vertical parking line 930 may not be included in the selected field of view 912. Until the vertical parking line 930 is visible in the selected field of view 912, the vehicle 304 may be unable to calculate its longitudinal error, (e.g., the distance between the vehicle rear axle 906 and the final parking position 904 along the x-axis). As the vehicle 304 moves into the selected parking space 910, the image captured in the selected field of view 912 can change and eventually include the vertical parking line 930.

Figure 9D:
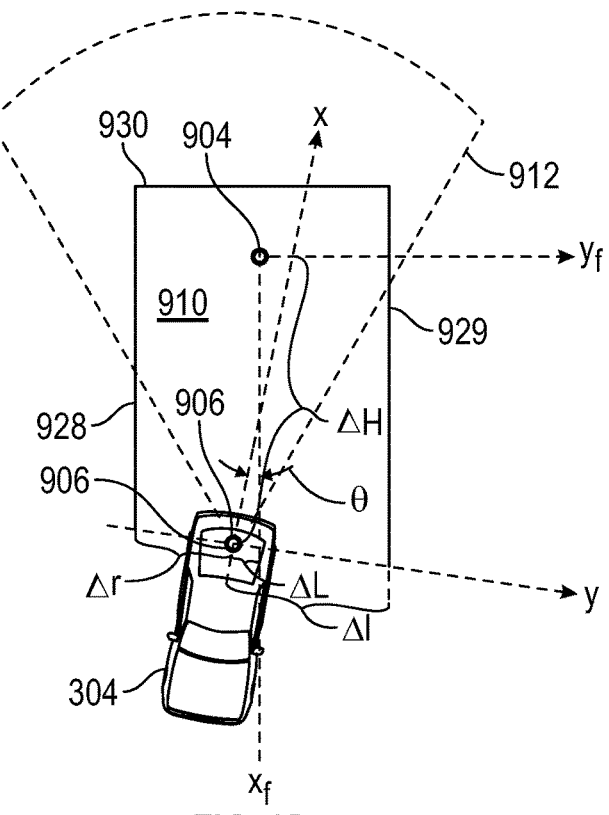

FIG. 9D illustrates exemplary lateral (ΔL), longitudinal (ΔH) and heading (θ) errors according to examples of the disclosure. In some examples, vehicle 304 can determine its longitudinal, lateral, and heading errors relative to the final parking position 904. The vehicle 304 can determine ΔL from Δr and Δl and can determine θ from α and/or β as described above with reference to FIG. 9C. As shown in FIG. 9D, vertical parking line 930 can be within selected field of view 912, allowing the vehicle 304 to determine its longitudinal error ΔH. As the vehicle continues to move into the selected parking space, its controller (e.g., controller 120) can cause the vehicle to move such that the lateral (ΔL), longitudinal (ΔH) and heading (θ) errors continue to decrease and eventually equal zero, indicating that the rear axle 906 is in the final parking position 904.

Figure 9E:
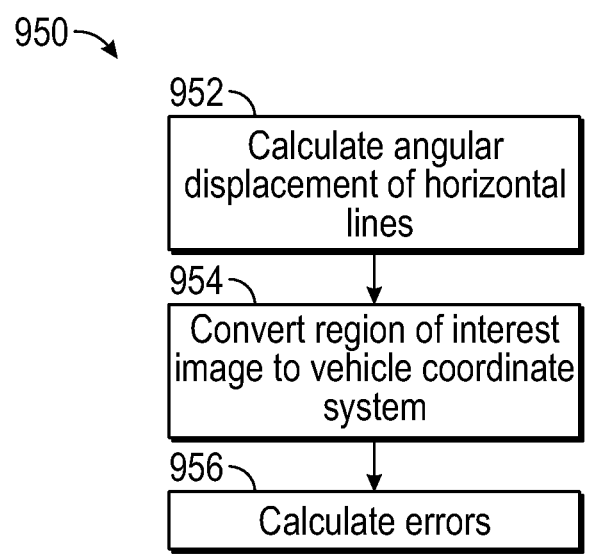

FIG. 9E illustrates an exemplary method 950 of calculating one or more errors in the position of vehicle 304 according to examples of the disclosure. Method 950 can correspond to the examples described with reference to FIGS. 9A-9D. At 952, the vehicle 304 can calculate the angular displacement of the horizontal parking lines (e.g., as described with reference to FIG. 9A). At 954, the vehicle 304 can convert the region of interest image to the vehicle coordinate system (e.g., as described with reference to FIG. 9B). At 956, the vehicle 304 can calculate one or more of its heading, lateral, and/or longitudinal errors relative to a final parking position 904 (e.g., as described with reference to FIGS. 9C-9D). When each of the lateral, longitudinal, and heading errors are below predetermined thresholds (e.g., when the errors are substantially zero or some other small value), the vehicle can autonomously enter a parked state. The parked state can comprise applying a parking brake, turning off the motor 131 or engine 132 of the vehicle, and/or otherwise powering down the vehicle.

It should be understood that one or more of methods 350, 450, 550, 650, 750, 850, and 950 can be performed simultaneously, repetitively, and/or sequentially in any order as the vehicle 304 performs an autonomous parking operation. Further, one or more additional sensors of the vehicle can be used in conjunction with the methods described herein to increase the precision of vehicle localization and/or to avoid one or more hazards (e.g., pedestrians, vehicles, animals) in the parking lot.

Thus, the examples of the disclosure provide various ways that a vehicle can perform autonomous parking in parking spaces delineated by parking lines using a camera and/or a GPS receiver.

Therefore, according to the above, some examples of the disclosure are related to a vehicle comprising: a camera; a range sensor; a GPS receiver; one or more actuator systems; and one or more processors operatively coupled to the camera, the range sensor, the GPS receiver, and the one or more actuator systems, the one or more processors configured to perform a method comprising: detecting two or more parking lines in one or more images captured by the camera; localizing the vehicle with respect to the two or more parking lines based on: location data of the vehicle determined from the GPS receiver, and a location determination for the vehicle based on detected ends of the two or more parking lines; determining an occupancy state of one or more parking spaces formed by the two or more parking lines using the range sensor; in accordance with a determination that the occupancy state of a respective parking space of the one or more parking spaces is empty, selecting the respective parking space; identifying a region of interest including the selected parking space; detecting one or more selected parking lines of the selected parking space within one or more captured images including all or part of the region of interest; calculating one or more errors of a current location of the vehicle based on the one or more selected parking lines; and moving the vehicle, using the one or more actuator systems, in a direction to reduce the one or more errors. Additionally or alternatively, in some examples, detecting the two or more parking lines comprises: determining pixel gradients in the one or more images; and detecting the two or more parking lines based on the determined pixel gradients. Additionally or alternatively, in some examples, detecting the ends of the two or more parking lines comprises: matching top and bottom edge pixels for each lane line; fitting linear models to the top and bottom edge pixels; and identifying an end of each lane line based on a pixel gradient template. Additionally or alternatively, in some examples, determining the location for the vehicle based on the detected ends of the two or more parking lines comprises: initializing a plurality of candidate vehicle positions; and assigning probabilities to the plurality of candidate vehicle positions based on the detected ends of the two or more parking lines. Additionally or alternatively, in some examples, determining the location for the vehicle based on the location data for the vehicle from the GPS receiver comprises: initializing a plurality of candidate vehicle positions; and assigning probabilities to the plurality of candidate vehicle positions based on a GPS location of the vehicle. Additionally or alternatively, in some examples, determining the occupancy state of the one or more parking spaces formed by the two or more parking lines using the range sensor comprises: initializing occupancy grid cells of an occupancy grid; updating the occupancy grid cells of the occupancy grid based on detections made by the range sensor; and determining the occupancy state of the one or more parking spaces based on the occupancy grid cells of the occupancy grid. Additionally or alternatively, in some examples, identifying the region of interest comprises: estimating a location of the region of interest based on one or more of the captured images that were captured before selecting the selected parking space; and after selecting the selecting parking space, capturing one or more of the captured images including all or part of the region of interest. Additionally or alternatively, in some examples, the one or more errors comprise one or more of: a lateral error comprising a first distance between a rear axle of the vehicle and a first parking line of the selected parking space and a second distance between the rear axle and a horizontal parking line of the selected parking space, the first and second lines of the selected parking space being oriented along a first axis; a longitudinal error comprising a third distance between the rear axle of the vehicle and a third parking line of the selected parking space, the third parking line oriented along a second axis orthogonal to the first axis; and a heading error comprising an angle between the vehicle and one of the first axis or second axis. Additionally or alternatively, in some examples, detecting the one or more parking lines of the selected parking space comprises applying one or more constraints based on an estimated region of interest to one or more images captured after selecting the selected parking space. Additionally or alternatively, in some examples, the method performed by the one or more processors further comprises: when the one or more errors are below a predetermined threshold, transition the vehicle to a parked state using the one or more actuator systems.

Some examples of the disclosure are directed to a non-transitory computer-readable storage medium storing instructions that, when executed by one or more processors included in a vehicle, causes the one or more processors to perform a method, the method comprising: detecting two or more parking lines in one or more images captured by a camera; localizing a vehicle with respect to the two or more parking lines based on: location data for the vehicle from a GPS receiver, and a location determination for the vehicle based on detected ends of the two or more parking lines; determining an occupancy state of one or more parking spaces formed by the two or more parking lines using a range sensor; and in accordance with a determination that the occupancy state of a respective parking space of the one or more parking spaces is empty, selecting the respective parking space; identifying a region of interest including the selected parking space; detecting one or more selected parking lines of the selected parking space within one or more captured images including all or part of the region of interest; calculating one or more errors of a current location of the vehicle based on the one or more selected parking lines; and moving the vehicle, using one or more actuator systems of the vehicle, in a direction to reduce the one or more errors. Additionally or alternatively, in some examples, detecting the two or more parking lines comprises: determining pixel gradients in the one or more images; and detecting the two or more parking lines based on the determined pixel gradients. Additionally or alternatively, in some examples, detecting the ends of the two or more parking lines comprises: matching top and bottom edge pixels for each lane line; fitting linear models to the top and bottom edge pixels; and identifying an end of each lane line based on a pixel gradient template. Additionally or alternatively, in some examples, determining the location for the vehicle based on the detected ends of the two or more parking lines comprises: initializing a plurality of candidate vehicle positions; and assigning probabilities to the plurality of candidate vehicle positions based on the detected ends of the two or more parking lines. Additionally or alternatively, in some examples, determining the location for the vehicle based on the location data for the vehicle from the GPS receiver comprises: initializing a plurality of candidate vehicle positions; and assigning probabilities to the plurality of candidate vehicle positions based on a GPS location of the vehicle. Additionally or alternatively, in some examples, determining the occupancy state of the one or more parking spaces formed by the two or more parking lines using the range sensor comprises: initializing occupancy grid cells of an occupancy grid; updating the occupancy grid cells of the occupancy grid based on detections made by the range sensor; and determining the occupancy state of the one or more parking spaces based on the occupancy grid cells of the occupancy grid. Additionally or alternatively, in some examples, identifying the region of interest comprises: estimating a location of the region of interest based on one or more of the captured images that were captured before selecting the selected parking space; and after selecting the selecting parking space, capturing one or more of the captured images including all or part of the region of interest. Additionally or alternatively, in some examples, the one or more errors comprise one or more of: a lateral error comprising a first distance between a rear axle of the vehicle and a first parking line of the selected parking space and a second distance between the rear axle and a horizontal parking line of the selected parking space, the first and second lines of the selected parking space being oriented along a first axis; a longitudinal error comprising a third distance between the rear axle of the vehicle and a third parking line of the selected parking space, the third parking line oriented along a second axis orthogonal to the first axis; and a heading error comprising an angle between the vehicle and one of the first axis or second axis. Additionally or alternatively, in some examples, detecting the one or more parking lines of the selected parking space comprises applying one or more constraints based on an estimated region of interest to one or more images captured after selecting the selected parking space. Additionally or alternatively, in some examples, the method performed by the one or more processors further comprises: when the one or more errors are below a predetermined threshold, transition the vehicle to a parked state using the one or more actuator systems.

Some examples of the disclosure are directed to a vehicle comprising: a camera; a range sensor; a GPS receiver; and one or more processors coupled to the camera, the range sensor and the GPS receiver, the one or more processors configured to perform a method comprising: detecting two or more parking lines in one or more images captured by the camera; localizing the vehicle with respect to the two or more parking lines based on: location data for the vehicle from the GPS receiver, and a location determination for the vehicle based on detected ends of the two or more parking lines; determining an occupancy state of one or more parking spaces formed by the two or more parking lines using the range sensor; and in accordance with a determination that the occupancy state of a respective parking space of the one or more parking spaces is empty, autonomously parking the vehicle in the respective parking space. Additionally or alternatively to one or more of the examples disclosed above, in some examples, detecting the two or more parking lines comprises: determining pixel gradients in the one or more images; and detecting the two or more parking lines based on the determined pixel gradients. Additionally or alternatively to one or more of the examples disclosed above, in some examples, detecting the two or more parking lines further comprises: performing Hough voting based on the determined pixel gradients; and detecting the two or more parking lines based on the Hough voting. Additionally or alternatively to one or more of the examples disclosed above, in some examples, detecting the ends of the two or more parking lines comprises: matching top and bottom edge pixels for each lane line; fitting linear models to the top and bottom edge pixels; and identifying an end of each lane line based on a pixel gradient template. Additionally or alternatively to one or more of the examples disclosed above, in some examples, determining the location for the vehicle based on the detected ends of the two or more parking lines comprises: initializing a plurality of candidate vehicle positions; and assigning probabilities to the plurality of candidate vehicle positions based on the detected ends of the two or more parking lines. Additionally or alternatively to one or more of the examples disclosed above, in some examples, determining the location for the vehicle based on the location data for the vehicle from the GPS receiver comprises: initializing a plurality of candidate vehicle positions; and assigning probabilities to the plurality of candidate vehicle positions based on a GPS location of the vehicle. Additionally or alternatively to one or more of the examples disclosed above, in some examples, localizing the vehicle with respect to the two or more parking lines comprises: initializing a plurality of candidate vehicle positions; assigning probabilities to the plurality of candidate vehicle positions based on the detected ends of the two or more parking lines; and assigning probabilities to the plurality of candidate vehicle positions based on a GPS location of the vehicle. Additionally or alternatively to one or more of the examples disclosed above, in some examples, localizing the vehicle with respect to the two or more parking lines comprises: propagating the plurality of candidate vehicle positions based on movement of the vehicle; and determining an updated location of the vehicle based on the propagated plurality of candidate vehicle positions. Additionally or alternatively to one or more of the examples disclosed above, in some examples, determining the occupancy state of the one or more parking spaces formed by the two or more parking lines using the range sensor comprises: initializing occupancy grid cells of an occupancy grid; updating the occupancy grid cells of the occupancy grid based on detections made by the range sensor; and determining the occupancy state of the one or more parking spaces based on the occupancy grid cells of the occupancy grid. Additionally or alternatively to one or more of the examples disclosed above, in some examples, determining the occupancy state of the one or more parking spaces formed by the two or more parking lines using the range sensor further comprises updating the occupancy grid cells of the occupancy grid at and end of each time step of a plurality of time steps based on a time constant.

Some examples of the disclosure are directed to a method comprising: detecting two or more parking lines in one or more images captured by a camera; localizing a vehicle with respect to the two or more parking lines based on: location data for the vehicle from a GPS receiver, and a location determination for the vehicle based on detected ends of the two or more parking lines; determining an occupancy state of one or more parking spaces formed by the two or more parking lines using a range sensor; and in accordance with a determination that the occupancy state of a respective parking space of the one or more parking spaces is empty, autonomously parking the vehicle in the respective parking space.

Some examples of the disclosure are directed to a vehicle comprising: a camera; a range sensor; a GPS receiver; and one or more processors coupled to the camera, the range sensor and the GPS receiver, the one or more processors configured to perform a method comprising: generating a plurality of candidate location estimates for the vehicle in a parking area; assigning a respective first probability to each respective candidate location estimate of the plurality of candidate location estimates based on location data for the vehicle from the GPS receiver; assigning a respective second probability to each respective candidate location estimate of the plurality of candidate location estimates based on a location determination for the vehicle that is based on detected ends of two or more parking lines in the parking area in an image captured by the camera; and determining a location of the vehicle in the parking area to be a first respective candidate location estimate of the plurality of candidate location estimates based on a total probability, comprising the respective first probability and the respective second probability, assigned to the first respective candidate location estimate. Additionally or alternatively to one or more of the examples disclosed above, in some examples, assigning the respective first probability to each respective candidate location estimate of the plurality of candidate location estimates based on the location data for the vehicle from the GPS receiver comprises: assigning a higher probability to candidate location estimates for the vehicle that are within a region including a GPS location of the vehicle; and assigning a lower probability to candidate location estimates for the vehicle that are outside of the region including the GPS location of the vehicle. Additionally or alternatively to one or more of the examples disclosed above, in some examples, the region including the GPS location of the vehicle is a unique region in the parking area. Additionally or alternatively to one or more of the examples disclosed above, in some examples, assigning the respective second probability to each respective candidate location estimate of the plurality of candidate location estimates based on the location determination for the vehicle that is based on the detected ends of the two or more parking lines in the parking area in the image captured by the camera comprises: assigning a higher probability to candidate location estimates for the vehicle that are within a plurality of regions positioned in the parking area based on the detected ends of the two or more parking lines in the parking area; and assigning a lower probability to candidate location estimates for the vehicle that are outside of the plurality of regions positioned in the parking area based on the detected ends of the two or more parking lines in the parking area. Additionally or alternatively to one or more of the examples disclosed above, in some examples, the method further comprises: resampling the candidate location estimates for the vehicle after assigning the respective first probabilities and the respective second probabilities, and before determining the location of the vehicle based on the total probability. Additionally or alternatively to one or more of the examples disclosed above, in some examples, the first respective candidate location estimate is the location of the vehicle at a current time step, and the method further comprises: at a next time step, after the current time step, propagating the plurality of candidate location estimates for the vehicle based on a movement of the vehicle; and determining the location of the vehicle at the next time step based on the propagated plurality of candidate location estimates. Additionally or alternatively to one or more of the examples disclosed above, in some examples, the method further comprises: at the next time step, initializing a plurality of new candidate location estimates for the vehicle based on the location of the vehicle at the current time step; and determining the location of the vehicle at the next time step based on the propagated plurality of candidate location estimates and the plurality of new candidate location estimates for the vehicle.

Some examples of the disclosure are directed to a method comprising: generating a plurality of candidate location estimates for a vehicle in a parking area; assigning a respective first probability to each respective candidate location estimate of the plurality of candidate location estimates based on location data for the vehicle from a GPS receiver; assigning a respective second probability to each respective candidate location estimate of the plurality of candidate location estimates based on a location determination for the vehicle that is based on detected ends of two or more parking lines in the parking area in an image captured by a camera; and determining a location of the vehicle in the parking area to be a first respective candidate location estimate of the plurality of candidate location estimates based on a total probability, comprising the respective first probability and the respective second probability, assigned to the first respective candidate location estimate.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A vehicle comprising:
a camera;
a range sensor;
a GPS receiver;
one or more actuator systems; and
one or more processors operatively coupled to the camera, the range sensor, the GPS receiver, and the one or more actuator systems, the one or more processors configured to perform a method comprising:
  detecting two or more parking lines in one or more images captured by the camera;
  localizing the vehicle with respect to the two or more parking lines based on:
    location data of the vehicle determined from the GPS receiver, and
    a location determination for the vehicle based on detected ends of the two or more parking lines;
  determining an occupancy state of one or more parking spaces formed by the two or more parking lines using the range sensor;
  in accordance with a determination that the occupancy state of a respective parking space of the one or more parking spaces is empty, selecting the respective parking space;
  identifying a region of interest including the selected parking space;
  detecting one or more selected parking lines of the selected parking space within one or more captured images including all or part of the region of interest;
  calculating one or more errors of a current location of the vehicle based on the one or more selected parking lines; and
  moving the vehicle, using the one or more actuator systems, in a direction to reduce the one or more errors.

2. The vehicle of claim 1, wherein detecting the two or more parking lines comprises:
determining pixel gradients in the one or more images; and
detecting the two or more parking lines based on the determined pixel gradients.

3. The vehicle of claim 1, wherein detecting the ends of the two or more parking lines comprises:
matching top and bottom edge pixels for each lane line;
fitting linear models to the top and bottom edge pixels; and
identifying an end of each lane line based on a pixel gradient template.

4. The vehicle of claim 1, wherein determining the location for the vehicle based on the detected ends of the two or more parking lines comprises:
initializing a plurality of candidate vehicle positions; and
assigning probabilities to the plurality of candidate vehicle positions based on the detected ends of the two or more parking lines.

5. The vehicle of claim 1, wherein determining the location for the vehicle based on the location data for the vehicle from the GPS receiver comprises:
initializing a plurality of candidate vehicle positions; and
assigning probabilities to the plurality of candidate vehicle positions based on a GPS location of the vehicle.

6. The vehicle of claim 1, wherein determining the occupancy state of the one or more parking spaces formed by the two or more parking lines using the range sensor comprises:
initializing occupancy grid cells of an occupancy grid;
updating the occupancy grid cells of the occupancy grid based on detections made by the range sensor; and
determining the occupancy state of the one or more parking spaces based on the occupancy grid cells of the occupancy grid.

7. The vehicle of claim 1, wherein identifying the region of interest comprises:
estimating a location of the region of interest based on one or more of the captured images that were captured before selecting the selected parking space; and
after selecting the selecting parking space, capturing one or more of the captured images including all or part of the region of interest.

8. The vehicle of claim 1, wherein the one or more errors comprise one or more of:
a lateral error comprising a first distance between a rear axle of the vehicle and a first parking line of the selected parking space and a second distance between the rear axle and a horizontal parking line of the selected parking space, the first and second lines of the selected parking space being oriented along a first axis;
a longitudinal error comprising a third distance between the rear axle of the vehicle and a third parking line of the selected parking space, the third parking line oriented along a second axis orthogonal to the first axis; and
a heading error comprising an angle between the vehicle and one of the first axis or second axis.

9. The vehicle of claim 1, wherein detecting the one or more parking lines of the selected parking space comprises applying one or more constraints based on an estimated region of interest to one or more images captured after selecting the selected parking space.

10. The vehicle of claim 1, wherein the method performed by the one or more processors further comprises:
when the one or more errors are below a predetermined threshold, transition the vehicle to a parked state using the one or more actuator systems.

11. A non-transitory computer-readable storage medium storing instructions that, when executed by one or more processors included in a vehicle, causes the one or more processors to perform a method, the method comprising:
detecting two or more parking lines in one or more images captured by a camera;
localizing a vehicle with respect to the two or more parking lines based on:
  location data for the vehicle from a GPS receiver, and
  a location determination for the vehicle based on detected ends of the two or more parking lines;
determining an occupancy state of one or more parking spaces formed by the two or more parking lines using a range sensor; and
in accordance with a determination that the occupancy state of a respective parking space of the one or more parking spaces is empty, selecting the respective parking space;
identifying a region of interest including the selected parking space;

detecting one or more selected parking lines of the selected parking space within one or more captured images including all or part of the region of interest;

calculating one or more errors of a current location of the vehicle based on the one or more selected parking lines; and moving the vehicle, using one or more actuator systems of the vehicle, in a direction to reduce the one or more errors.

12. The non-transitory computer-readable storage medium of claim 11, wherein detecting the two or more parking lines comprises:

determining pixel gradients in the one or more images; and detecting the two or more parking lines based on the determined pixel gradients.

13. The non-transitory computer-readable storage medium of claim 11, wherein detecting the ends of the two or more parking lines comprises:

matching top and bottom edge pixels for each lane line;

fitting linear models to the top and bottom edge pixels; and identifying an end of each lane line based on a pixel gradient template.

14. The non-transitory computer-readable storage medium of claim 11, wherein determining the location for the vehicle based on the detected ends of the two or more parking lines comprises:

initializing a plurality of candidate vehicle positions; and assigning probabilities to the plurality of candidate vehicle positions based on the detected ends of the two or more parking lines.

15. The non-transitory computer-readable storage medium of claim 11, wherein determining the location for the vehicle based on the location data for the vehicle from the GPS receiver comprises:

initializing a plurality of candidate vehicle positions; and assigning probabilities to the plurality of candidate vehicle positions based on a GPS location of the vehicle.

16. The non-transitory computer-readable storage medium of claim 11, wherein determining the occupancy state of the one or more parking spaces formed by the two or more parking lines using the range sensor comprises:

initializing occupancy grid cells of an occupancy grid;

updating the occupancy grid cells of the occupancy grid based on detections made by the range sensor; and determining the occupancy state of the one or more parking spaces based on the occupancy grid cells of the occupancy grid.

17. The non-transitory computer-readable storage medium of claim 1, wherein identifying the region of interest comprises:

estimating a location of the region of interest based on one or more of the captured images that were captured before selecting the selected parking space; and after selecting the selecting parking space, capturing one or more of the captured images including all or part of the region of interest.

18. The non-transitory computer-readable storage medium of claim 11, wherein the one or more errors comprise one or more of:

a lateral error comprising a first distance between a rear axle of the vehicle and a first parking line of the selected parking space and a second distance between the rear axle and a horizontal parking line of the selected parking space, the first and second lines of the selected parking space being oriented along a first axis;

a longitudinal error comprising a third distance between the rear axle of the vehicle and a third parking line of the selected parking space, the third parking line oriented along a second axis orthogonal to the first axis; and a heading error comprising an angle between the vehicle and one of the first axis or second axis.

19. The non-transitory computer-readable storage medium of claim 11, wherein detecting the one or more parking lines of the selected parking space comprises applying one or more constraints based on an estimated region of interest to one or more images captured after selecting the selected parking space.

20. The non-transitory computer-readable storage medium of claim 11, wherein the method performed by the one or more processors further comprises:

when the one or more errors are below a predetermined threshold, transition the vehicle to a parked state using the one or more actuator systems.

* * * * *